(12) United States Patent
Tsuda

(10) Patent No.: US 9,747,536 B2
(45) Date of Patent: Aug. 29, 2017

(54) IMAGE PROCESSING APPARATUS AND IMAGE FORMING APPARATUS

(71) Applicant: FUJI XEROX CO., LTD., Tokyo (JP)

(72) Inventor: Shinsuke Tsuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/044,608

(22) Filed: Feb. 16, 2016

(65) Prior Publication Data

US 2017/0076186 A1 Mar. 16, 2017

(30) Foreign Application Priority Data

Sep. 11, 2015 (JP) .................................. 2015-179232

(51) Int. Cl.
*G06K 15/02* (2006.01)
(52) U.S. Cl.
CPC ..... *G06K 15/1859* (2013.01); *G06K 15/1836* (2013.01); *G06K 2215/0094* (2013.01)
(58) Field of Classification Search
USPC .......................................................... 358/1.1
See application file for complete search history.

(56) References Cited

U.S. PATENT DOCUMENTS

| 7,027,187 B1* | 4/2006 | Zuber | H04N 1/00002 358/1.9 |
|---|---|---|---|
| 2005/0280861 A1* | 12/2005 | Shima | H04N 1/00954 358/1.15 |
| 2013/0250353 A1* | 9/2013 | Hara | G06K 15/1857 358/1.15 |

FOREIGN PATENT DOCUMENTS

| JP | 2005-215925 A | 8/2005 |
|---|---|---|
| JP | 2005-316543 A | 11/2005 |

\* cited by examiner

*Primary Examiner* — Ngon Nguyen
(74) *Attorney, Agent, or Firm* — Oliff PLC

(57) ABSTRACT

An image processing apparatus includes multiple image processing units, a detector, and a distribution unit. The multiple image processing units perform image processing to convert image data distributed on a page-by-page basis into raster-format color print data. The detector detects a processing-load cycle of a case where image data is converted into print data on a page-by-page basis. The distribution unit distributes on a page-by-page basis to the multiple image processing units image data included in a received print command and, in a case where it is determined in accordance with the processing-load cycle and the number of the multiple image processing units that pages involving heavy processing loads may be distributed to a specific image processing unit in a non-uniform manner, changes, from a preset distribution order, a distribution order of the multiple image processing units.

9 Claims, 30 Drawing Sheets

FIG. 10

LIST OF RASTERIZATION TIME
PERIODS FOR RESPECTIVE PAGES

| PAGE NUMBER | RASTERIZATION TIME PERIOD | DIFFERENCE BETWEEN RASTERIZATION TIME PERIODS |
|---|---|---|
| P16 | 67 ms | 2 ms |
| P8 | 65 ms | 3 ms |
| P4 | 62 ms | 1 ms |
| P12 | 61 ms | 37 ms |
| P3 | 24 ms | 0 ms |
| P2 | 24 ms | 1 ms |
| P7 | 23 ms | 0 ms |
| P13 | 23 ms | 1 ms |
| P1 | 22 ms | 0 ms |
| P6 | 22 ms | 1 ms |
| P9 | 21 ms | 0 ms |
| P15 | 21 ms | 0 ms |
| P11 | 20 ms | 1 ms |
| P5 | 20 ms | 0 ms |
| P10 | 20 ms | 0 ms |
| P14 | 19 ms | |

EXTRACTION ⇒

LIST OF PAGES INVOLVING
HEAVY PROCESSING LOADS

| PAGE NUMBER | RASTERIZATION TIME PERIOD |
|---|---|
| P16 | 67 ms |
| P8 | 65 ms |
| P4 | 62 ms |
| P12 | 61 ms |

MAXIMUM VALUE AMONG
DIFFERENCES BETWEEN
RASTERIZATION TIME PERIODS

FIG. 11

LIST OF PAGES INVOLVING HEAVY PROCESSING LOADS

| PAGE NUMBER | RASTERIZATION TIME PERIOD |
|---|---|
| P16 | 67 ms |
| P8 | 65 ms |
| P4 | 62 ms |
| P12 | 61 ms |

| PAGE NUMBER | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| PROCESSING-LOAD FLAG | 0 | 0 | 0 | 0 | 0 | 0 | 0 | 0 | 0 | 0 | 0 | 0 | 0 | 0 | 0 | 0 |

↓

| PAGE NUMBER | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| PROCESSING-LOAD FLAG | 0 | 0 | 0 | 1 | 0 | 0 | 0 | 1 | 0 | 0 | 0 | 1 | 0 | 0 | 0 | 1 |

PROCESSING-LOAD FLAG = 1 : HEAVY PROCESSING LOAD

NUMBER OF PAGES OF REPETITIVE PATTERN: 4
NUMBER OF PAGES PER SHEET: 1-UP    DOUBLE-SIDED PRINTING (FRONT-SIDE PRINTING)

| P1 | P15 | P21 | ...... | → 51Y RIP UNIT |
| P3 | P9 | P23 | ...... | → 51M RIP UNIT |
| P5 | P11 | P17 | ...... | → 51C RIP UNIT |
| P7 | P13 | P19 | ...... | → 51K RIP UNIT |

(BACK-SIDE PRINTING)

| P2 | P16 | P22 | ...... | → 52Y RIP UNIT |
| P4 | P10 | P24 | ...... | → 52M RIP UNIT |
| P6 | P12 | P18 | ...... | → 52C RIP UNIT |
| P8 | P14 | P20 | ...... | → 52K RIP UNIT |

SINCE VALUE OF S × N (8) IS GREATER THAN NUMBER OF PAGES OF REPETITIVE PATTERN (4), NEXT DISTRIBUTION DESTINATION SET IN DISTRIBUTION ORDER IS SKIPPED EVERY TIME EIGHT PAGES ARE DISTRIBUTED.

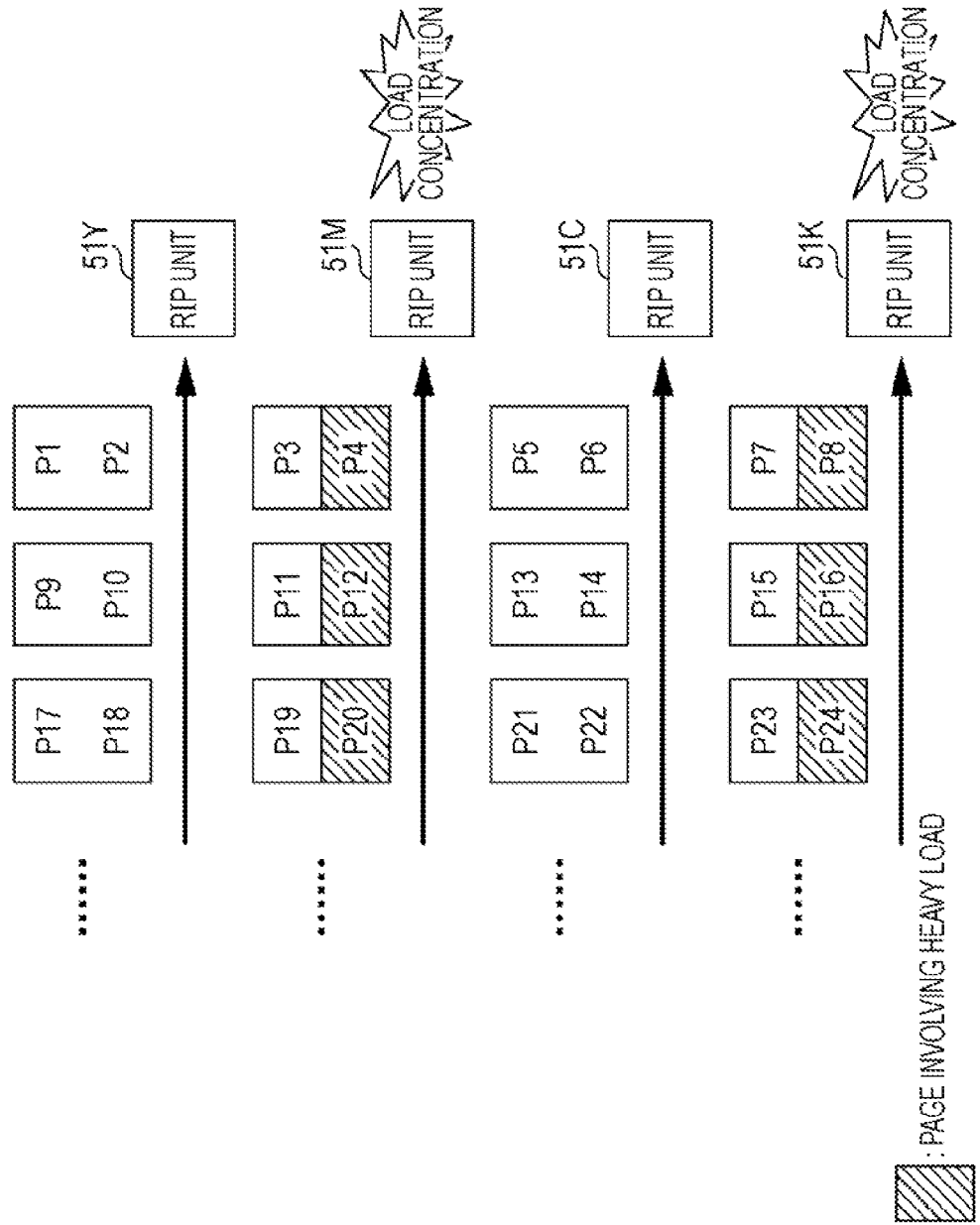

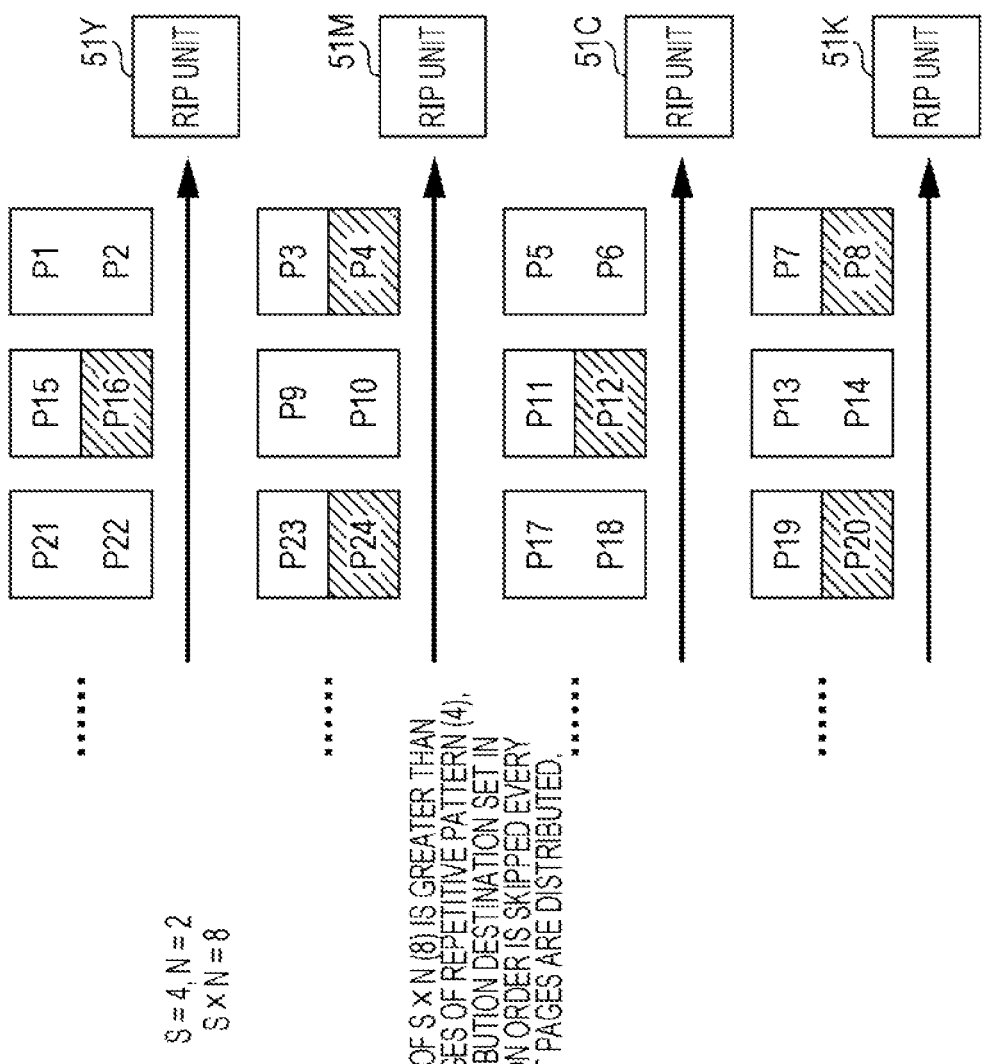

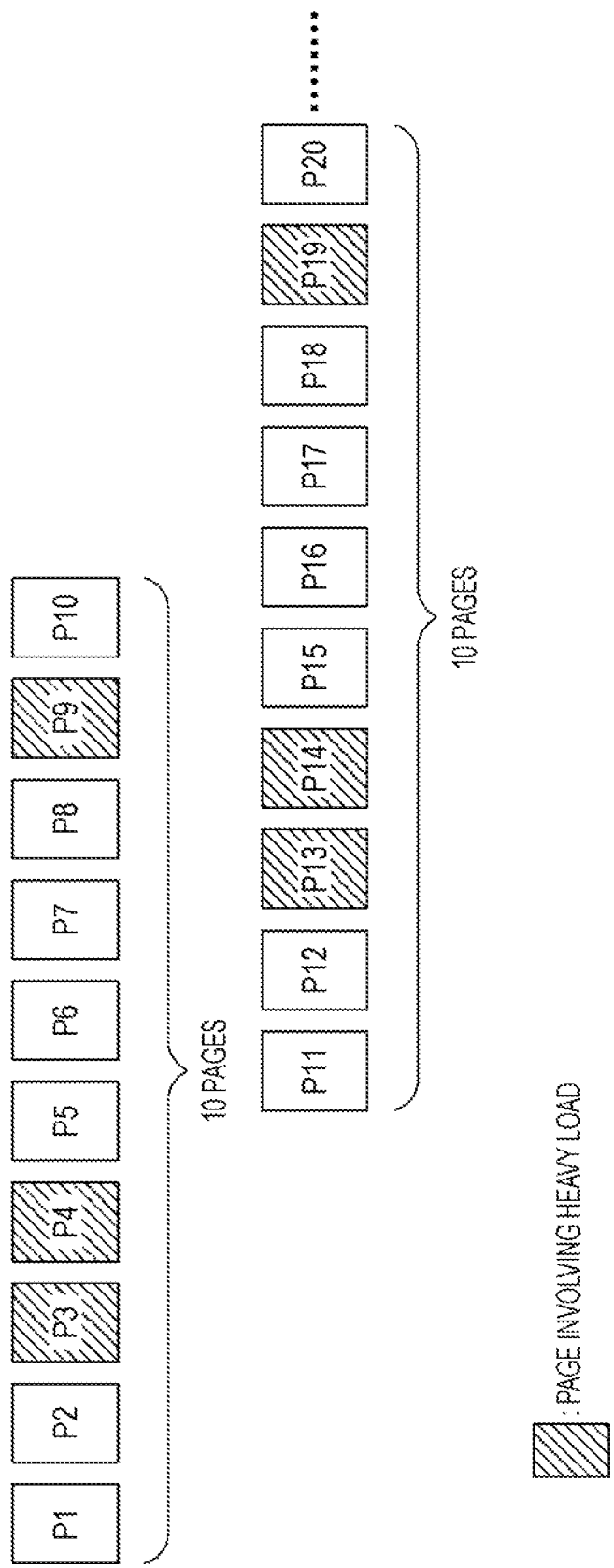

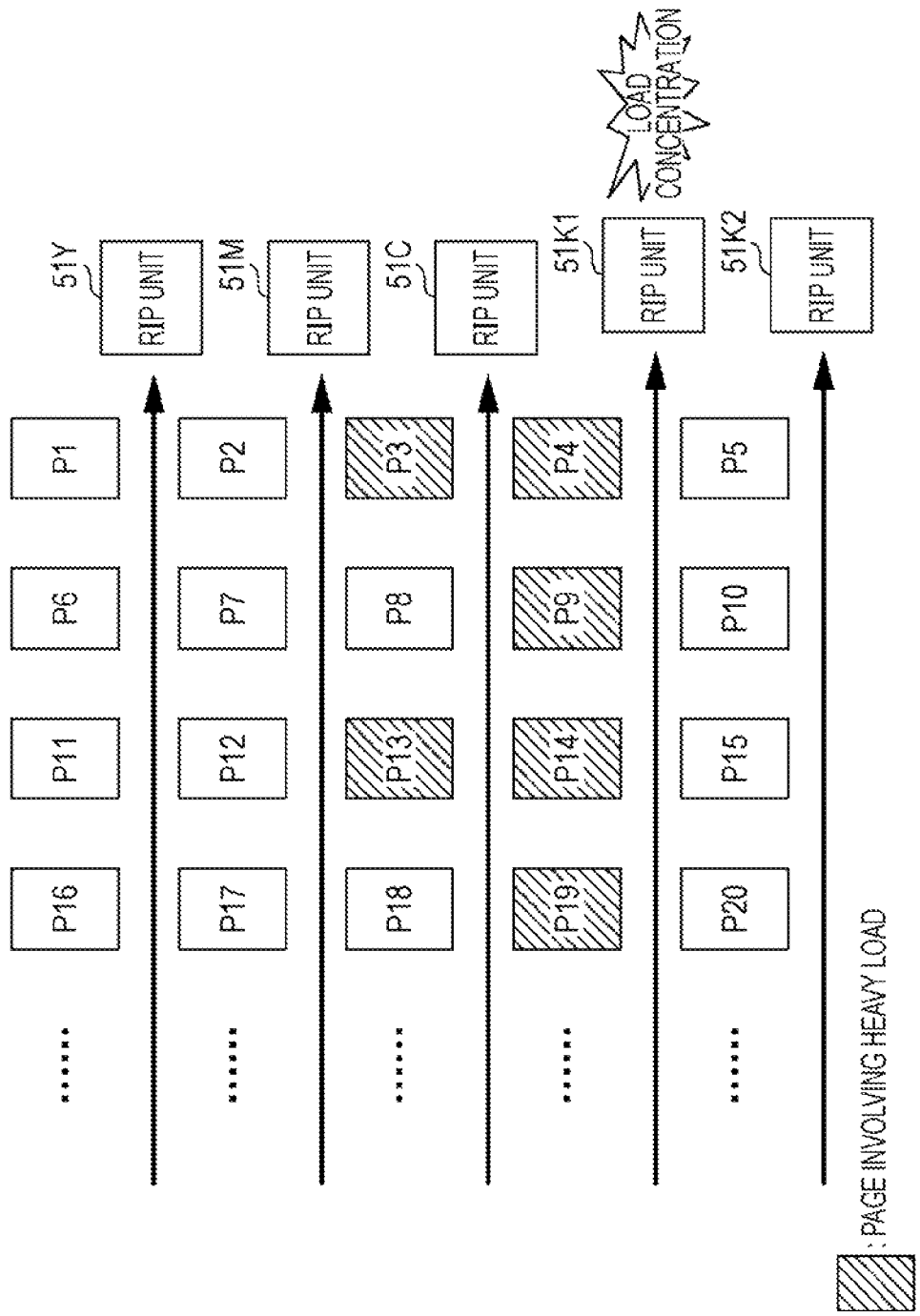

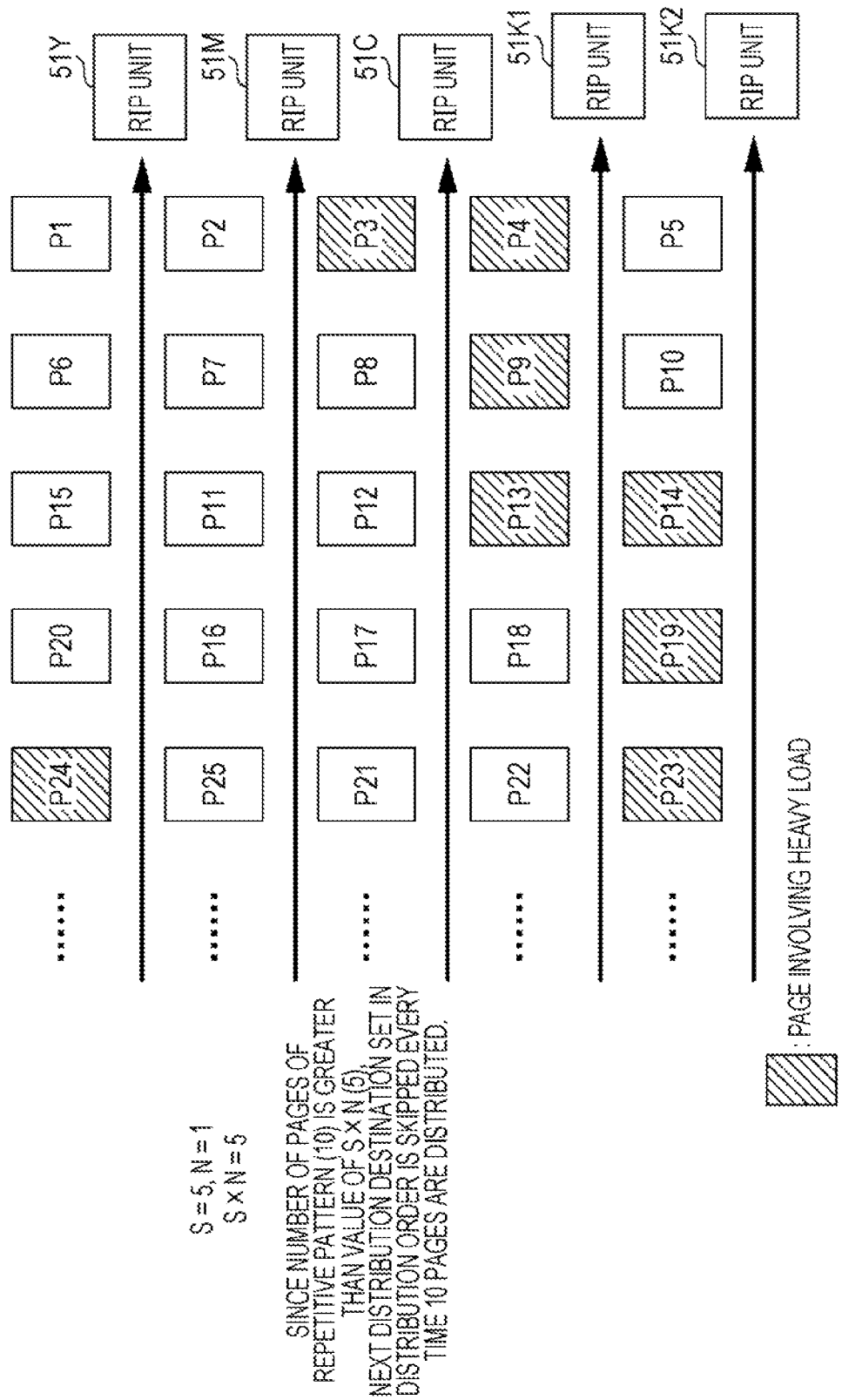

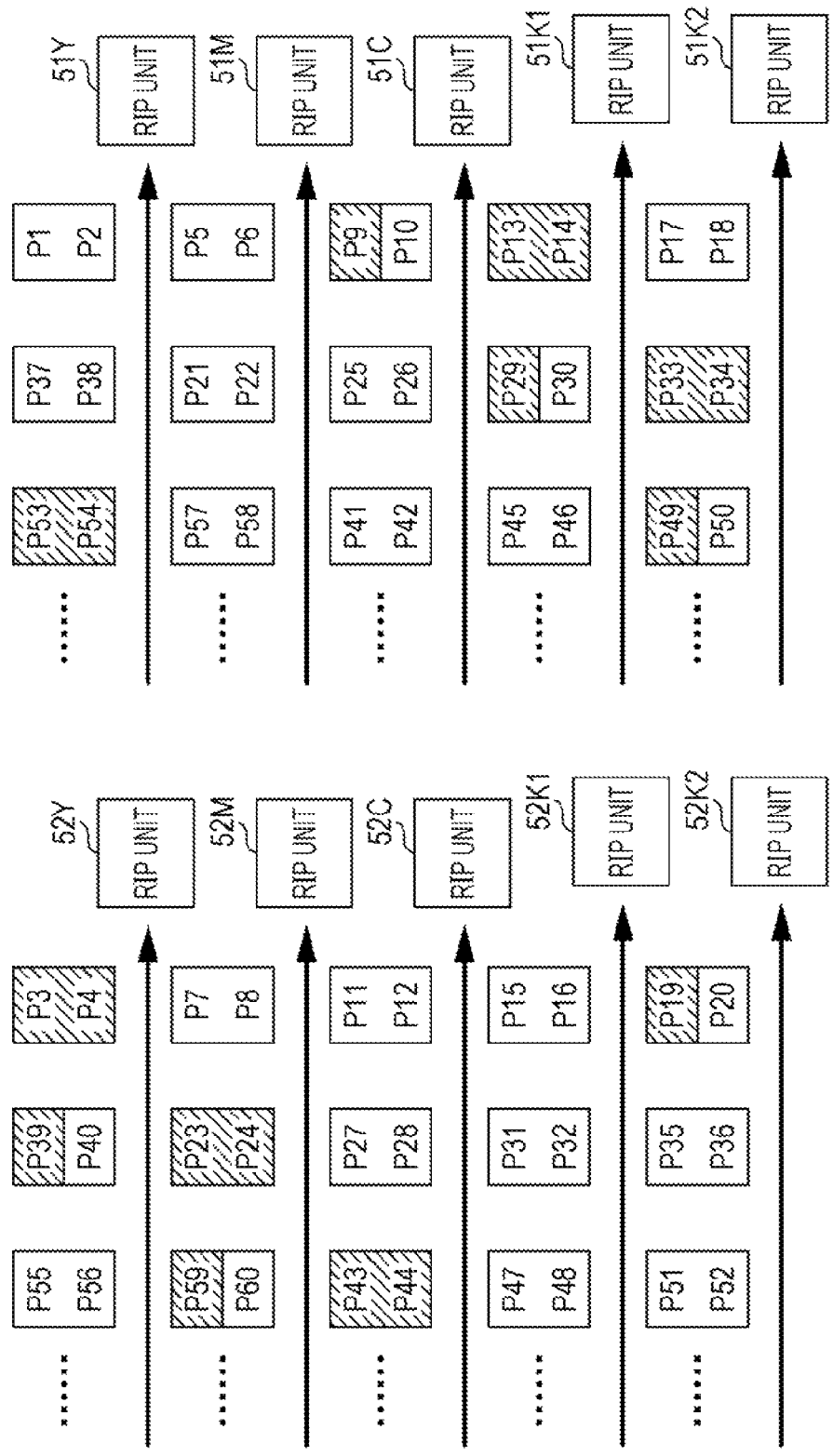

IMAGE PROCESSING APPARATUS AND IMAGE FORMING APPARATUS

CROSS-REFERENCE TO RELATED APPLICATIONS

This application is based on and claims priority under 35 USC 119 from Japanese Patent Application No. 2015-179232 filed Sep. 11, 2015.

BACKGROUND

Technical Field

The present invention relates to an image processing apparatus and an image forming apparatus.

SUMMARY

According to an aspect of the invention, there is provided an image processing apparatus including multiple image processing units, a detector, and a distribution unit. The multiple image processing units perform image processing to convert image data distributed on a page-by-page basis into raster-format color print data, the raster-format color print data including pieces of print data for colors. The detector detects a processing-load cycle of a case where image data is converted into print data on a page-by-page basis. The distribution unit distributes on a page-by-page basis to the multiple image processing units image data included in a received print command and, in a case where it is determined in accordance with the processing-load cycle detected by the detector and the number of the multiple image processing units that pages involving heavy processing loads may be distributed to a specific image processing unit in a non-uniform manner, changes, from a preset distribution order, a distribution order of the multiple image processing units, to which image data is distributed.

BRIEF DESCRIPTION OF THE DRAWINGS

An exemplary embodiment of the present invention will be described in detail based on the following figures, wherein:

FIG. 10 is a diagram illustrating a case where rasterization time periods acquired for respective pages are sorted in descending order in terms of length of processing time;

FIG. 11 is a diagram illustrating an example of an array of processing-load flags;

FIG. 20 is a diagram illustrating, in contrast to the state illustrated in FIG. 19, a case where the distribution unit has changed the distribution order;

FIG. 21 is a diagram illustrating a case where the distribution unit distributes image data without changing the distribution order from a preset distribution order when the number of pages of a repetitive pattern is four, the number of pages per sheet is two, and single-sided printing is performed;

FIG. 22 is a diagram illustrating, in contrast to the state illustrated in FIG. 21, a case where the distribution unit has changed the distribution order;

FIG. 23 is a diagram illustrating an example of a print job whose number of pages of a repetitive pattern is 10;

FIG. 24 is a diagram illustrating a case where the distribution unit distributes image data without changing the distribution order from a preset distribution order when the number of pages of a repetitive pattern is 10, the number of pages per sheet is 1, and single-sided printing is performed;

FIG. 25 is a diagram illustrating, in contrast to the state illustrated in FIG. 24, a case where the distribution unit has changed the distribution order;

FIG. 31 is a diagram illustrating, in contrast to the state illustrated in FIG. 30, a case where the distribution unit has changed the distribution order.

DETAILED DESCRIPTION

Next, an exemplary embodiment of the present invention will be described in detail with reference to the drawings.

Figure 1:
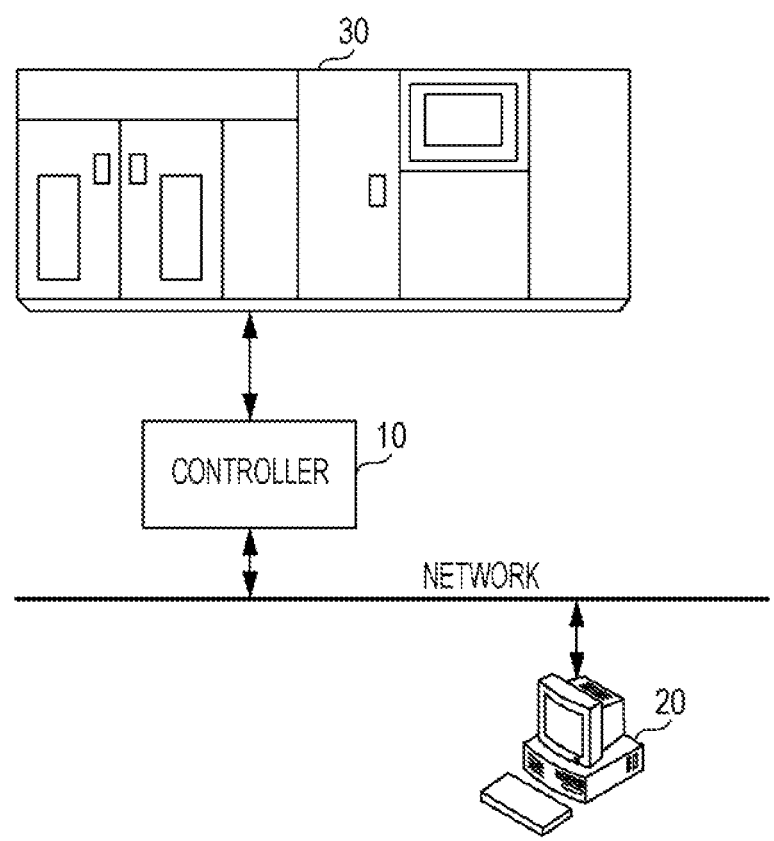
FIG. 1 is a diagram illustrating the configuration of an image forming system according to an exemplary embodiment of the present invention.

FIG. 1 is a diagram illustrating the configuration of an image forming system according to the exemplary embodiment of the present invention.

The image forming system according to the exemplary embodiment of the present invention includes, as illustrated in FIG. 1, a printer 30, a controller (print control device) 10, and a terminal apparatus 20. The printer 30 is able to perform high-volume printing at a high speed.

The terminal apparatus 20 generates a print job (print command) for commanding execution of a print process, and transmits the print job to the controller 10 via a network. The controller 10 receives the print job transmitted from the terminal apparatus 20, and serves as an image processing apparatus that controls a print operation of the printer 30. The printer 30 outputs an image corresponding to print data onto continuous paper under control performed by the controller 10.

Figure 2:
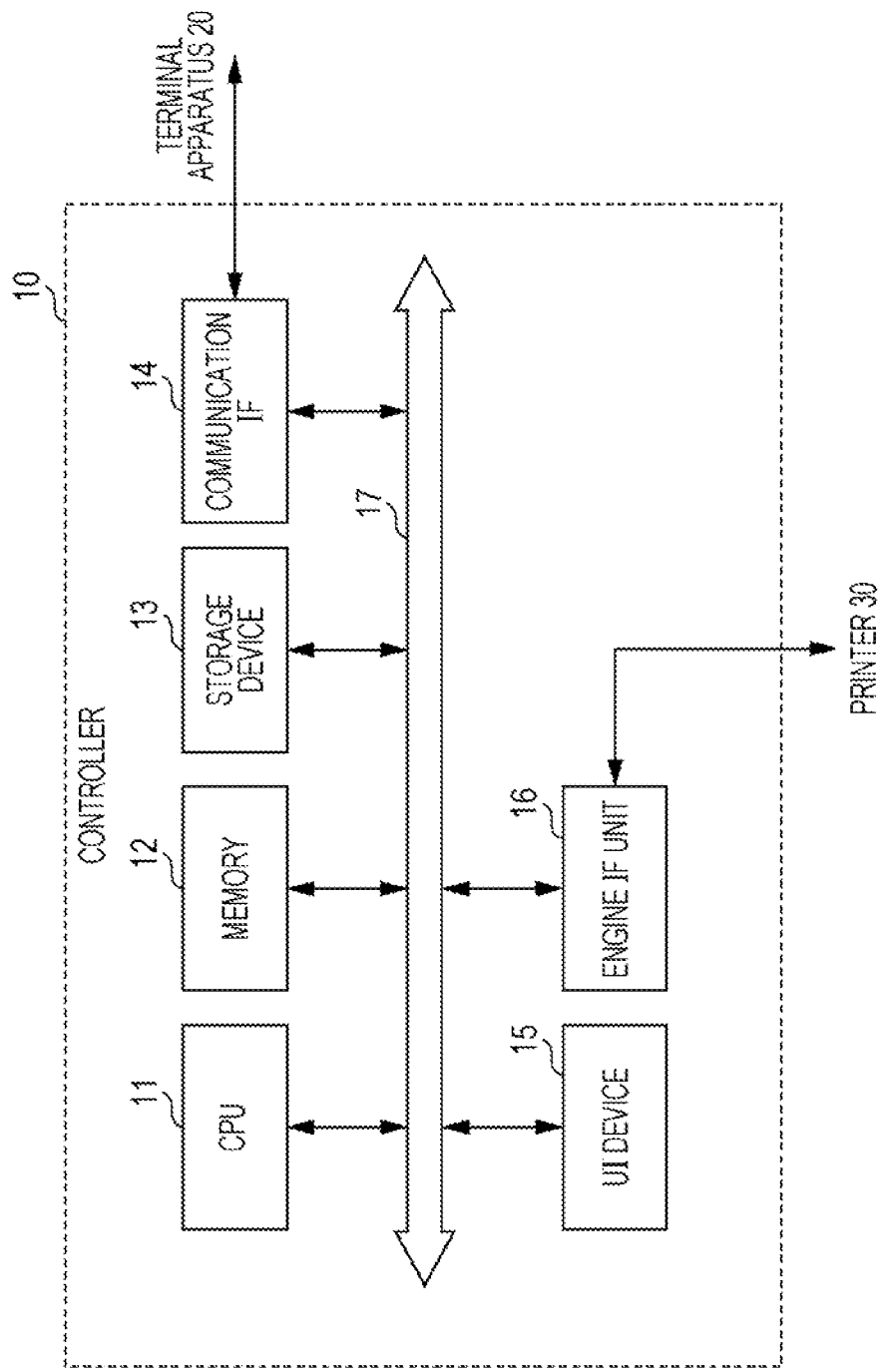
FIG. 2 is a block diagram illustrating a hardware configuration of a controller according to the exemplary embodiment of the present invention.

Next, FIG. 2 illustrates a hardware configuration of the controller 10 in the image forming system according to the present exemplary embodiment.

The controller 10 includes, as illustrated in FIG. 2, a central processing unit (CPU) 11, a memory 12, a storage device 13, a communication interface (IF) 14, a user interface (UI) device 15, and an engine interface (IF) unit 16. An example of the storage device 13 is a hard disk drive (HDD). The communication IF 14 transmits and receives data to and from an external apparatus such as the terminal apparatus 20 via a network. The UI device 15 includes a touch panel or a liquid crystal display, and a keyboard. The engine IF unit 16 communicates with the printer 30. These structural elements are connected to each other via a control bus 17.

The CPU 11 controls an operation of the controller 10 by executing a certain process in accordance with a control program stored in the memory 12 or the storage device 13.

Note that it has been described in the present exemplary embodiment that the CPU 11 reads out and executes the control program stored in the memory 12 or the storage device 13, but the program may be stored in a storage medium such as a CD-ROM and provided to the CPU 11.

Figure 3:
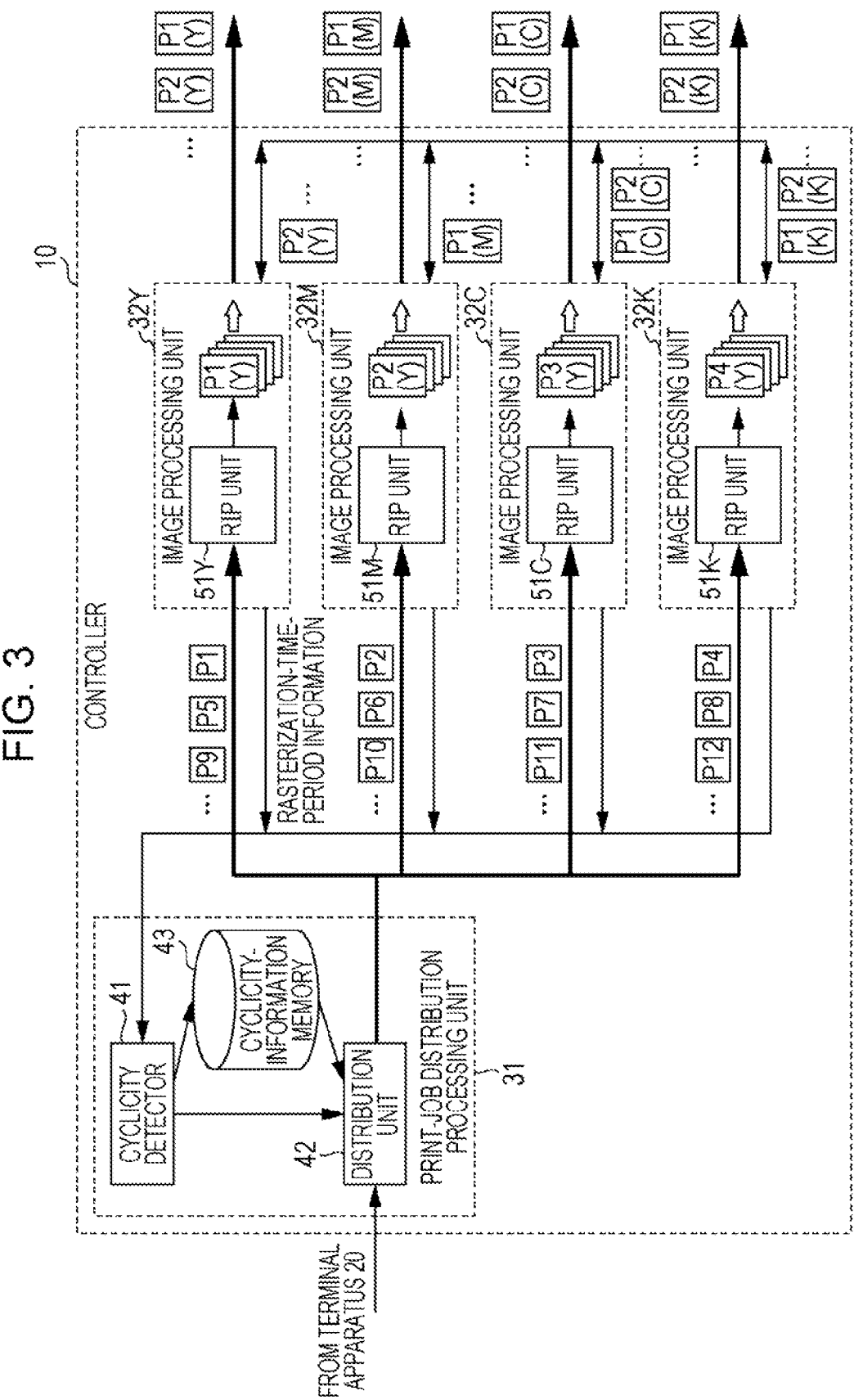
FIG. 3 is a block diagram illustrating a functional configuration of the controller according to the exemplary embodiment of the present invention.
Figure 4:
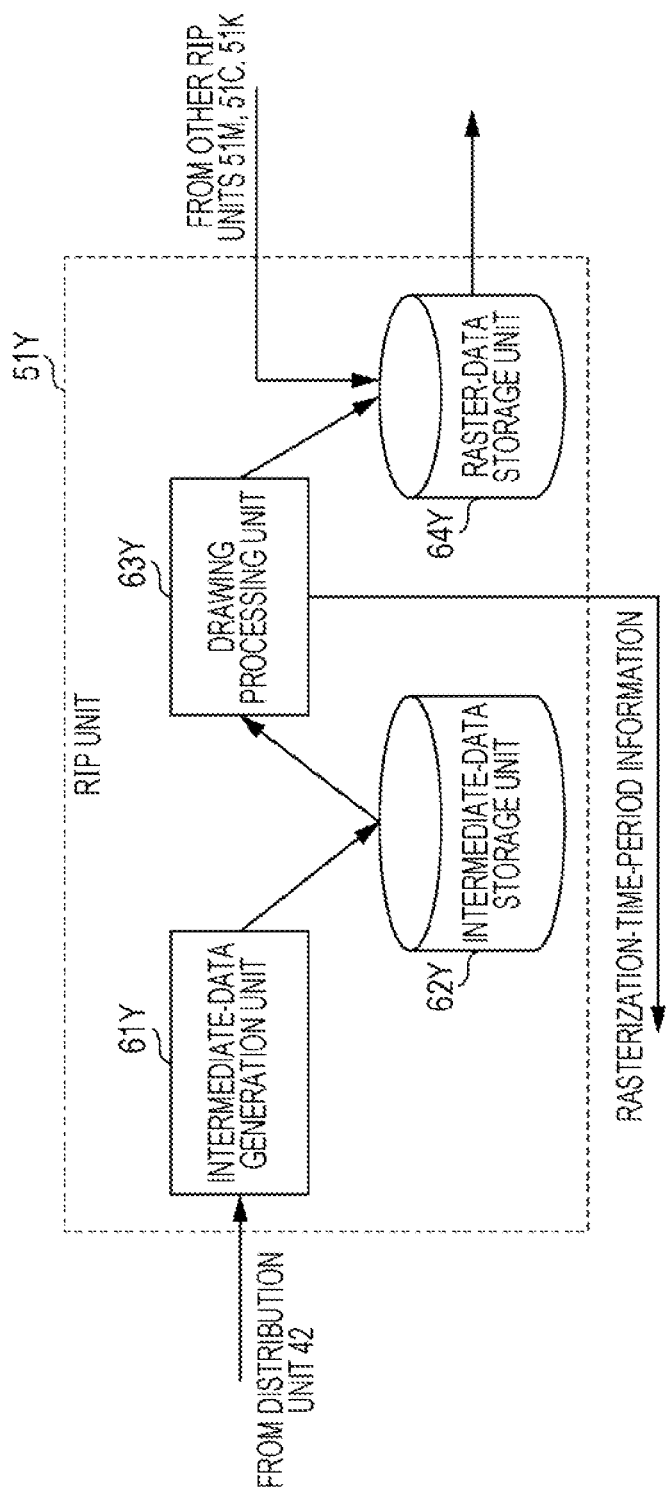
FIG. 4 is a block diagram illustrating the configuration of an RIP unit.

FIG. 3 is a block diagram illustrating a functional configuration of the controller 10 realized by execution of the above-described control program.

The controller 10 according to the present exemplary embodiment includes, as illustrated in FIG. 3, a print-job distribution processing unit 31 and four image processing units 32Y to 32K.

The print-job distribution processing unit 31 includes a cyclicity detector 41, a distribution unit 42, and a cyclicity-information memory 43.

The cyclicity detector 41 detects a processing-load cycle of a case where image data is converted into print data on a page-by-page basis. Specifically, the cyclicity detector 41 acquires pieces of rasterization-time-period information from the respective image processing units 32Y to 32K, the pieces of rasterization-time-period information being pieces of information regarding processing time periods required to convert image data into print data. The cyclicity detector 41 then determines processing loads on a page-by-page basis for a case where the image data is converted into the print data, and detects a processing-load cycle.

Note that a processing time period required to convert PDL-format image data into intermediate data is shorter than a processing time period required to convert the intermediate data into raster-format print data. Thus, here, an image-data processing load is evaluated using only a rasterization time period, which is a processing time period required to convert intermediate data into raster-format print data.

The distribution unit 42 distributes on a page-by-page basis to the four image processing units 32Y to 32K image data included in a print job received from the terminal apparatus 20.

In addition, the distribution unit 42 determines, in accordance with the processing-load cycle detected by the cyclicity detector 41 and the number of the image processing units 32Y to 32K, whether or not pages involving heavy processing loads may be distributed to a specific image processing unit in a non-uniform manner. In the case where it is determined that pages involving heavy processing loads may be distributed to a specific image processing unit in a non-uniform manner (in a concentrated manner), the distribution unit 42 changes, from a preset distribution order, the distribution order of the four image processing units 32Y to 32K, to which image data is distributed.

Here, information regarding a processing-load cycle includes information regarding the number of pages of a repetitive pattern (repetitive cycle), which is the number of pages in units of which a processing-load pattern is cyclically repeated.

In the case where the number of pages of this repetitive cycle may be divided without a remainder by the number of the image processing units 32Y to 32K or an aliquot of the number other than one, the distribution unit 42 determines whether or not pages involving heavy processing loads may be distributed to a specific image processing unit in a non-uniform manner. The distribution unit 42 changes, from a preset distribution order, the distribution order of the four image processing units 32Y to 32K, to which image data is distributed.

In addition, every time the distribution unit 42 distributes image data of pages the number of which is the greater one of the number obtained by multiplying the number of the image processing units 32Y to 32K by the number of pages per sheet and the number of pages of this repetitive cycle, the distribution unit 42 may skip the image processing unit that is the next distribution destination set in the preset distribution order and to which the next image data is supposed to be distributed.

Note that the following will describe, using specific examples, a specific determination method in which the above-described distribution unit 42 determines that pages involving heavy processing loads are to be distributed to a specific image processing unit in a non-uniform manner, and the details of a specific method in which the distribution unit 42 changes a distribution order for image data.

The cyclicity-information memory 43 stores information regarding a processing-load cycle detected by the cyclicity detector 41.

Thus, in the case where a print service whose content is similar to that of a print service executed in the past is to be executed, the distribution unit 42 may perform the following using the information regarding the processing-load cycle stored in the cyclicity-information memory 43. When image data included in a received print job is distributed to the image processing units 32Y to 32K on a page-by-page basis, the distribution unit 42 may determine, in accordance with the information regarding this processing-load cycle and the number of the image processing units 32Y to 32K, whether or not pages involving heavy processing loads may be distributed to a specific image processing unit in a non-uniform manner.

Furthermore, the four image processing units 32Y to 32K have raster image processing (RIP) units 51Y to 51K, respectively. The RIP units 51Y to 51K perform image processing on image data distributed on a page-by-page basis from the distribution unit 42, so that the image data is converted into raster-format CMYK print data.

Next, the RIP units 51Y to 51K will be described in detail. Since basic operations of the RIP units 51Y to 51K are substantially the same as each other, only an operation of the RIP unit 51Y will be described in the following description.

The RIP unit 51Y includes an intermediate-data generation unit 61Y, an intermediate-data storage unit 62Y, a drawing processing unit 63Y, and a raster-data storage unit 64Y.

The intermediate-data generation unit 61Y converts one-page image data distributed from the distribution unit 42 into intermediate data in an intermediate format, and stores the intermediate data in the intermediate-data storage unit 62Y.

The drawing processing unit 63Y generates raster-format print data in accordance with the intermediate data stored in the intermediate-data storage unit 62Y, and stores the raster-format print data in the raster-data storage unit 64Y. Note that the drawing processing unit 63Y transfers to the cyclicity detector 41 a processing time period required to convert intermediate data into raster-format print data, as rasterization-time-period information.

Although the RIP unit 51Y generates four-color (YMCK) print data, pieces of three-color (MCK) print data other than the Y print data are transferred to the respective RIP units 51M, 51C, and 51K. The Y print data is handled by the RIP unit 51Y. Likewise, Y print data generated at the RIP units 51M, 51C, and 51K is transferred to the RIP unit 51Y.

The RIP unit 51Y transmits to the printer 30 the color print data stored in the raster-data storage unit 64Y. The RIP units 51M to 51K transmit to the printer 30 the color print data stored in raster-data storage units 64M to 64K.

The printer 30 outputs, onto a recording medium such as a paper sheet for printing, an image based on the raster-format print data obtained by conversion performed by the four image processing units 32Y to 32K.

Next, issues will be described that may occur in a case where a print job for which the processing load is cyclically heavy is simply subjected to a print process in a system having the four image processing units 32Y to 32K as illustrated in FIG. 3.

Figure 5:
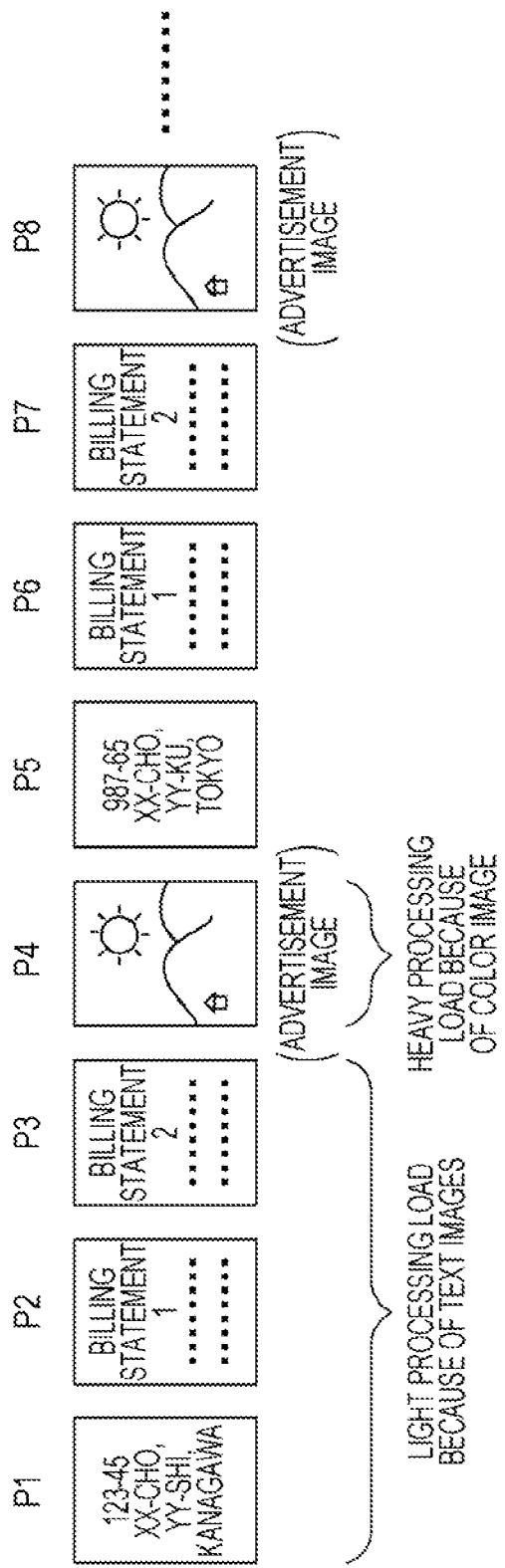
FIG. 5 is a diagram illustrating an example of a print job including a color-image page involving a heavy processing load at every fourth page.

For example, a case will be described where a print process is executed in accordance with a print job configured as illustrated in FIG. 5. The print job illustrated in FIG. 5 includes a color-image page involving a heavy processing load at every fourth page such as image data P4 at page 4 and image data P8 at page 8.

Figure 6:
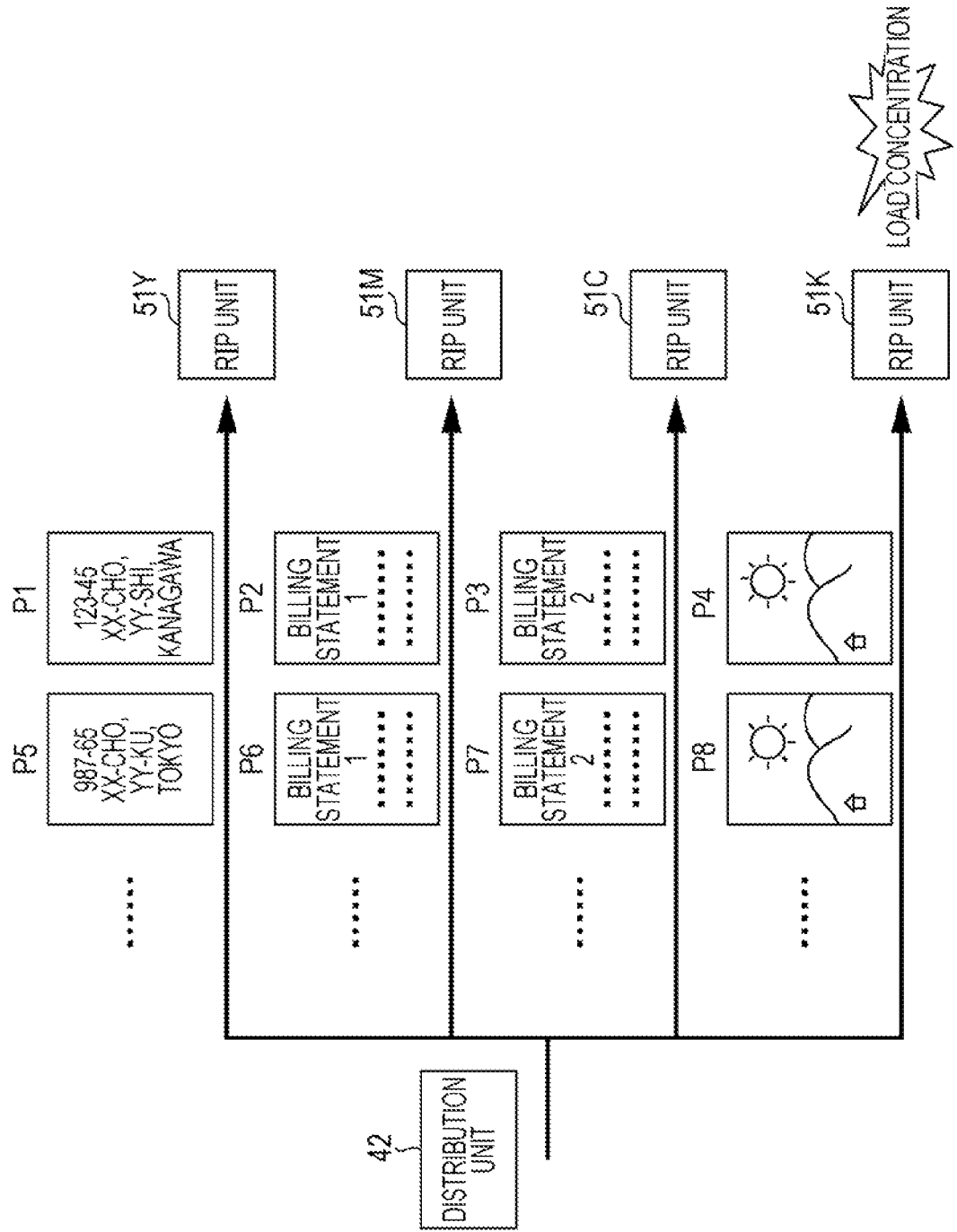
FIG. 6 is a diagram illustrating a case where the print job illustrated in FIG. 5 is processed in a system including four image processing units.

As a result, in the case where the print job illustrated in FIG. 5 is processed in the system having the four image processing units 32Y to 32K, the processing load becomes concentrated at a specific image processing unit, which is the RIP unit 51K, as illustrated in FIG. 6.

Thus, in the image forming system according to the present exemplary embodiment, the distribution order is switched to another in order to prevent the processing load from becoming concentrated at a specific image processing unit.

Figure 7:
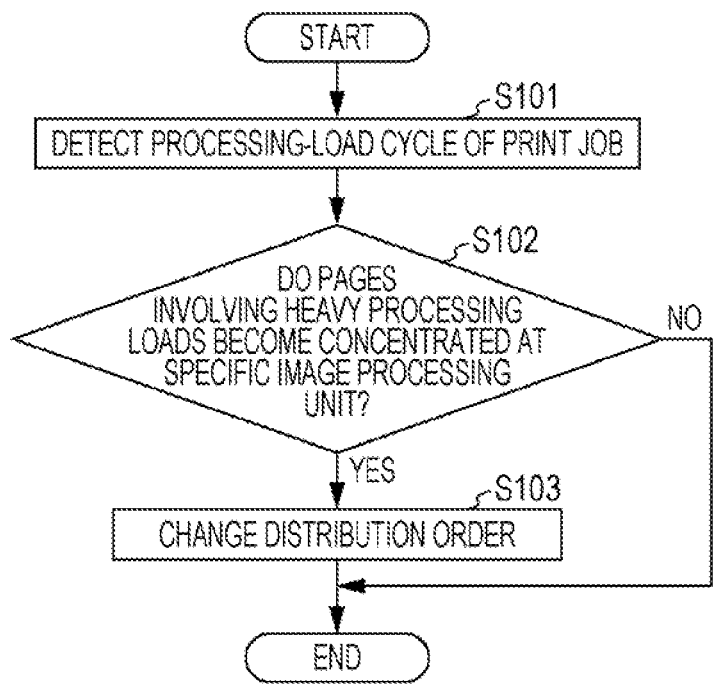
FIG. 7 is a flowchart illustrating a process for switching a distribution order to another in order to prevent a processing load from becoming concentrated at a specific image processing unit in the image forming system according to the exemplary embodiment of the present invention.

A process for switching a distribution order to another in order to prevent a processing load from becoming concentrated at a specific image processing unit in the image forming system according to the present exemplary embodiment will be described with reference to the flowchart of FIG. 7.

First, the cyclicity detector 41 detects a processing-load cycle of a print job (step S101). In the case where the distribution unit 42 determines that pages involving heavy processing loads become concentrated at a specific image processing unit if distribution is performed using a preset distribution method (yes in step S102), the distribution unit 42 changes the distribution order from the preset distribution order (step S103).

Here, the preset distribution order is for example a distribution order of the RIP units 51Y to 51K (the image processing units 32Y to 32K) such that distribution destinations are sequentially switched from one to another in the order of the RIP unit 51Y, the RIP unit 51M, the RIP unit 51C, the RIP unit 51K, the RIP unit 51Y, and so on.

Figure 8:
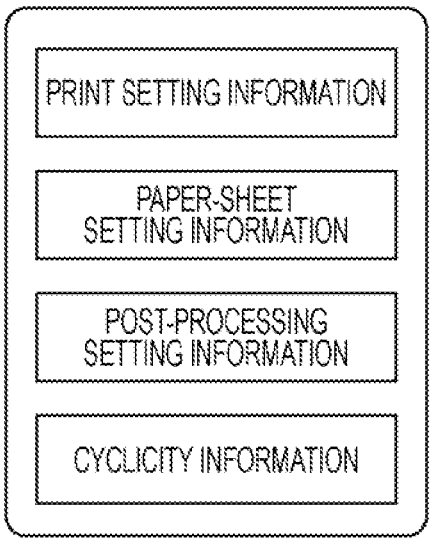
FIG. 8 is a diagram illustrating a case where information regarding a processing-load cycle (cyclicity information) is stored together with print setting information, paper-sheet setting information, post-processing setting information, and the like as print-job setting information.

Note that print jobs configured similarly to each other tend to be repeatedly executed in a print service performing high-volume printing. Thus, as illustrated in FIG. 8, information regarding a processing-load cycle obtained when a certain print job is executed once (cyclicity information) is stored together with print setting information, paper-sheet setting information, post-processing setting information, and the like as print-job setting information. In a case where another print job is executed for the print service, the stored print-job setting information may be applied.

In addition, even in a case where cyclicity information regarding a certain print job has not been acquired in advance before execution of the certain print job, cyclicity information may be acquired during execution of the print job, and the distribution order may be switched to another in the middle of the execution of the print job.

Figure 9:
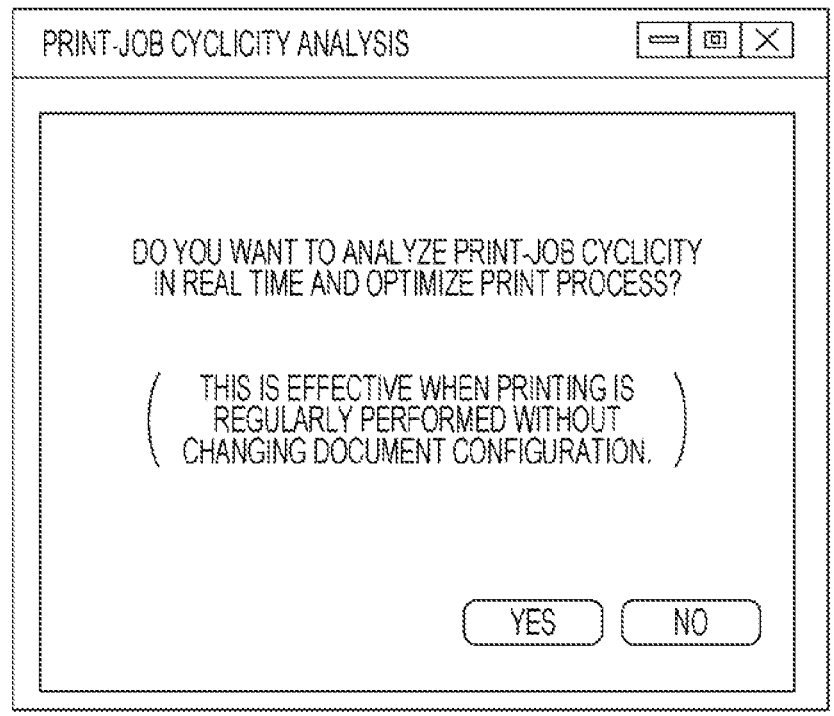
FIG. 9 is a diagram illustrating an example of a screen displayed when an inquiry is made of a user about whether or not to acquire cyclicity information.

Note that in a case where a print job whose cyclicity information has not been acquired is to be executed, a display screen as illustrated in FIG. 9 may be displayed before execution of the print job. When a user approves acquisition of cyclicity information, a cyclicity analysis may be performed as to whether or not cyclicity is present, and cyclicity information may be acquired.

Next, a specific operation performed when the cyclicity detector 41 detects the presence or absence of cyclicity and information regarding the cycle in accordance with pieces of rasterization-time-period information acquired from the respective RIP units 51Y to 51K will be described with reference to the drawings.

Note that the cyclicity detector 41 treats a certain range of pages as determination-target pages, and performs a detection operation for detecting cyclicity. In the following description, cyclicity information is detected in accordance with rasterization-time-period information regarding 16 pages, P1 to P16.

First, the cyclicity detector 41 sorts in descending order the rasterization time periods acquired for the respective pages in terms of length of processing time as illustrated in FIG. 10. The cyclicity detector 41 then calculates rasterization-time-period differences between pages by calculating the difference between every two adjacent processing time periods in the list acquired as a result of sorting.

The cyclicity detector 41 determines that a boundary is defined at a page corresponding to the maximum rasterization-time-period difference, and that the pages at and before the boundary are pages having long rasterization time periods and involving heavy processing loads.

It is determined in the example illustrated in FIG. 10 that data P16, P8, P4, and P12 of pages 16, 8, 4, and 12 are pages involving heavy processing loads.

Next, as illustrated in FIG. 11, the cyclicity detector 41 prepares an array in which processing-load flags are set for the respective determination-target pages. For pages determined to be pages involving heavy processing loads, the processing-load flags are set to "1". For the other pages, the processing-load flags are set to "0".

Here, a certain page having a processing-load flag of "1" indicates that the page is a page involving a heavy processing load.

Figure 12:
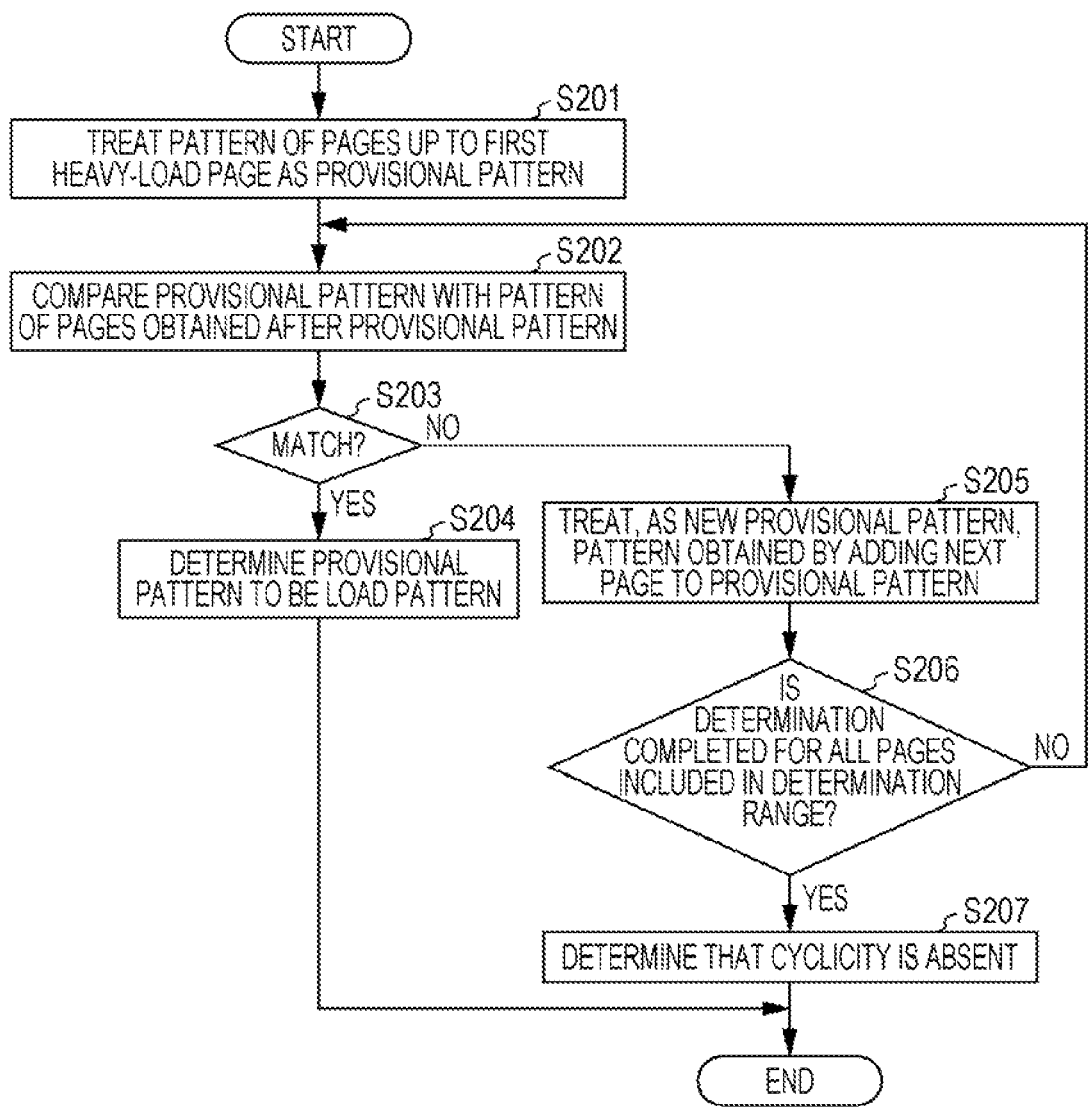
FIG. 12 is a flowchart illustrating an operation performed when a cyclicity detector detects the presence or absence of cyclicity and detects cyclicity information in accordance with an array of processing-load flags.

The cyclicity detector 41 detects the presence or absence of cyclicity and detects cyclicity information in accordance with this array of processing-load flags, using a method as illustrated in the flowchart of FIG. 12.

Figure 13:
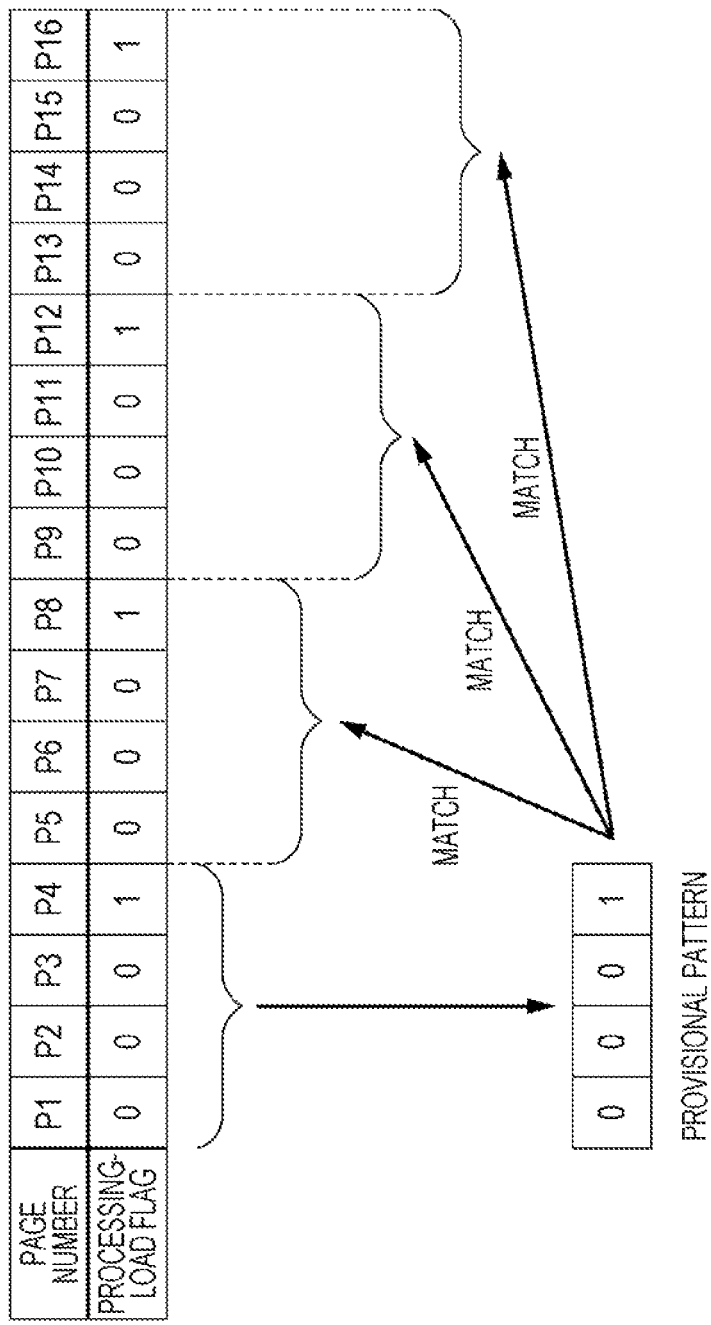
FIG. 13 is a diagram illustrating a case where a repetitive pattern is detected from an array of processing-load flags.

First, the cyclicity detector 41 treats, as a provisional pattern, the pattern of pages up to the first heavy-load page in an array of processing-load flags as illustrated in FIG. 11 (step S201). For example, in the example of the array of processing-load flags as illustrated in FIG. 11, a pattern of "0001" is determined to be a provisional pattern as illustrated in FIG. 13.

Next, the cyclicity detector 41 compares this provisional pattern with the pattern of certain pages obtained after the provisional pattern (step S202). In the case where the provisional pattern matches the pattern of the certain pages obtained after the provisional pattern (yes in step S203), the cyclicity detector 41 determines that the provisional pattern is a load pattern (repetitive pattern) (step S204).

Note that in the case where the provisional pattern does not match the pattern of the certain pages obtained after the provisional pattern (no in step S203), the cyclicity detector 41 treats, as a new provisional pattern, a pattern obtained by adding the next processing-load flag to the provisional pattern (step S205). The cyclicity detector 41 compares this new provisional pattern with the pattern of certain pages obtained after the new provisional pattern (step S202). The cyclicity detector 41 executes this process until determination is completed for all the pages included in a determination-target range.

Note that in the case where determination is completed for all the pages included in the determination-target range (yes in step S206), the cyclicity detector 41 determines that cyclicity is absent, and completes the process (step S207).

Note that since a provisional pattern of "0001" matches the pattern of pages at and after page 5 in the example illustrated in FIG. 13, it is determined that the pattern "0001" is a repetitive pattern.

Figure 14:
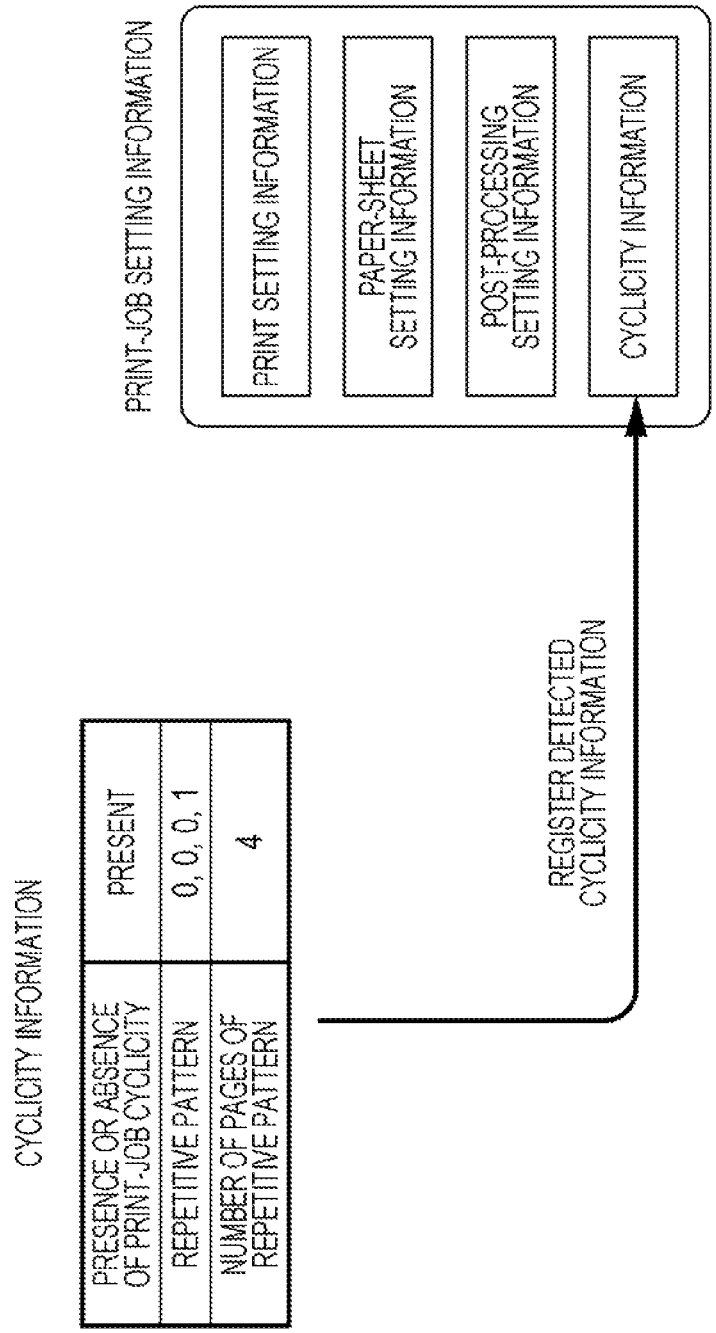
FIG. 14 is a diagram illustrating an example of cyclicity information detected by the cyclicity detector.

As a result of such a determination process, the cyclicity detector 41 stores, as print-job setting information, the following cyclicity information: "present" as the presence or absence of print-job cyclicity; "0, 0, 0, 1" as a repetitive pattern; and "4" as the number of pages of the repetitive pattern as illustrated in FIG. 14.

Figure 15:
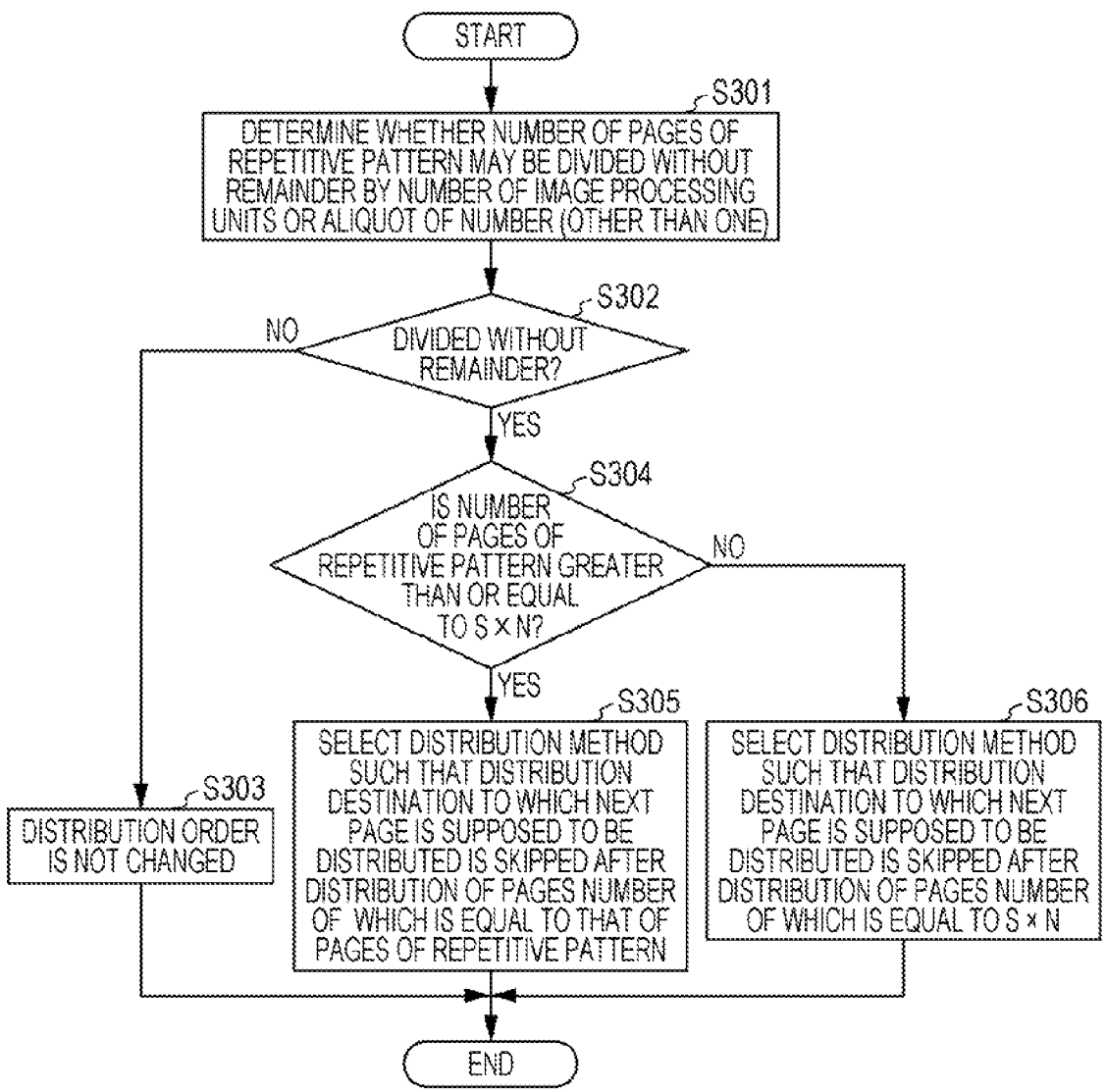
FIG. 15 is a flowchart for describing a specific example of a case where a distribution unit determines, in accordance with the number of pages of a repetitive pattern and the number of image processing units, whether or not a processing load becomes concentrated at a specific image processing unit, and switches the distribution order to another.

The following describes with reference to the flowchart of FIG. 15 a specific example of a case where the distribution unit 42 determines, in accordance with the number of pages of a repetitive pattern and the number of the image processing units 32Y to 32K, whether or not the processing load becomes concentrated at a specific image processing unit, and switches the distribution order to another.

First, the distribution unit 42 determines whether or not the number of pages of the repetitive pattern may be divided without a reminder by the number of the image processing units 32Y to 32K or an aliquot of the number other than one (step S301). Note that in the case where the number of pages of the repetitive pattern may be divided without a reminder by the number of the image processing units 32Y to 32K or an aliquot of the number other than one, the distribution unit 42 determines that the processing load may become concentrated at a specific image processing unit. In the case where the number of pages of the repetitive pattern may not be divided without a reminder by the number of the image processing units 32Y to 32K or an aliquot of the number other than one, the distribution unit 42 determines that the processing load is less likely to become concentrated at a specific image processing unit.

For example, since the number of pages of the repetitive pattern is four and the number of the image processing units 32Y to 32K (the RIP units 51Y to 51K) is also four in the above-described example, the number of pages of the repetitive pattern may be divided without a reminder. Thus, it is determined that the processing load may become concentrated at a specific image processing unit.

Note that even in a case where the number of pages of a repetitive pattern is two and the number of the image processing units 32Y to 32K is four, two, which is the number of pages of the repetitive pattern, may be divided without a reminder by two, which is an aliquot of the number (four) of the image processing units 32Y to 32K. Thus, it is determined that the processing load may become concentrated at a specific image processing unit.

In the case where it is determined that the number of pages of the repetitive pattern may be divided without a reminder by the number of the image processing units 32Y to 32K or an aliquot of the number other than one (yes in step S302), the distribution unit 42 sets S to the number of the image processing units 32Y to 32K and N to the number of pages per sheet in a case where an N-up process is performed. The distribution unit 42 determines whether or not the number of pages of the repetitive pattern is greater than or equal to the value of S×N (step S304). In the case where it is determined that the number of pages of the repetitive pattern may not be divided without a reminder by the number of the image processing units 32Y to 32K or an aliquot of the number other than one (no in step S302), the distribution unit 42 does not change the distribution order (step S303).

Note that in the case of an N-up process in which images of two pages are arranged on one physical page (2-up process), N=2. In the case of an N-up process in which images of four pages are arranged on one physical page (4-up process), N=4.

In the case where it is determined that the number of pages of the repetitive pattern is greater than or equal to the value of S×N (yes in step S304), the distribution unit 42 selects a distribution method such that the distribution destination to which the next page is supposed to be distributed is skipped after distribution of pages the number of which is equal to the number of pages of the repetitive pattern (step S305).

Note that in the case where it is determined that the number of pages of the repetitive pattern is not greater than or equal to the value of S×N (no in step S304), the distribution unit 42 selects a distribution method such that the distribution destination to which the next page is supposed to be distributed is skipped after distribution of pages the number of which is equal to S×N (step S306).

That is, the distribution unit 42 selects a distribution method such that the distribution destination to which the next page is supposed to be distributed is skipped after distribution of pages the number of which is equal to the greater one of the number of pages of the repetitive pattern and the number of S×N pages.

With reference to FIGS. 16 to 31, the following describes processes regarding prevention of processing-load concentration at a specific image processing unit in certain situations. A combination of the number of pages of a repetitive pattern, the number of pages per sheet, and single-sided printing/double-sided printing differs from situation to situation. The processing load is prevented from becoming concentrated at a specific image processing unit by changing the distribution order.

[Number of Pages of Repetitive Pattern: 4, Number of Pages Per Sheet: 1, Single-Sided Printing]

Figure 16:
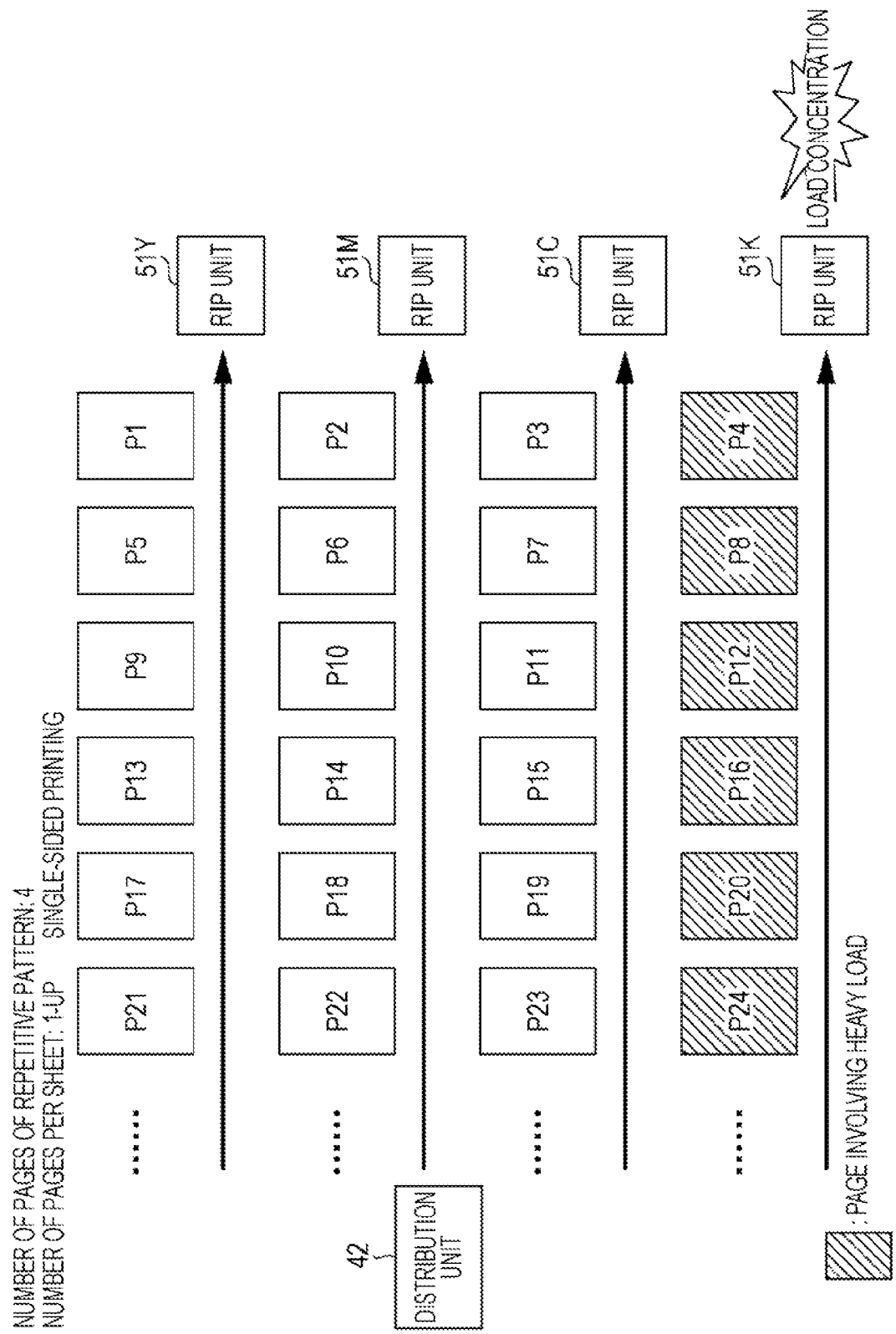
FIG. 16 is a diagram illustrating a case where the distribution unit distributes image data without changing the distribution order from a preset distribution order when the number of pages of a repetitive pattern is four, the number of pages per sheet is one, and single-sided printing is performed.

First, FIG. 16 illustrates a case where the distribution unit 42 distributes image data without changing the distribution order from a preset distribution order when the number of pages of a repetitive pattern is four, the number of pages per sheet is one, and single-sided printing is performed.

With reference to FIG. 16, the number of pages of the repetitive pattern, which is four, matches the number of certain image processing units (the RIP units 51Y to 51K), which is four. Pages P4, P8, P12, and so on involving heavy processing loads are thus successively distributed to the RIP unit 51K. As a result, it is clear that the processing load is concentrated at the RIP unit 51K.

Figure 17:
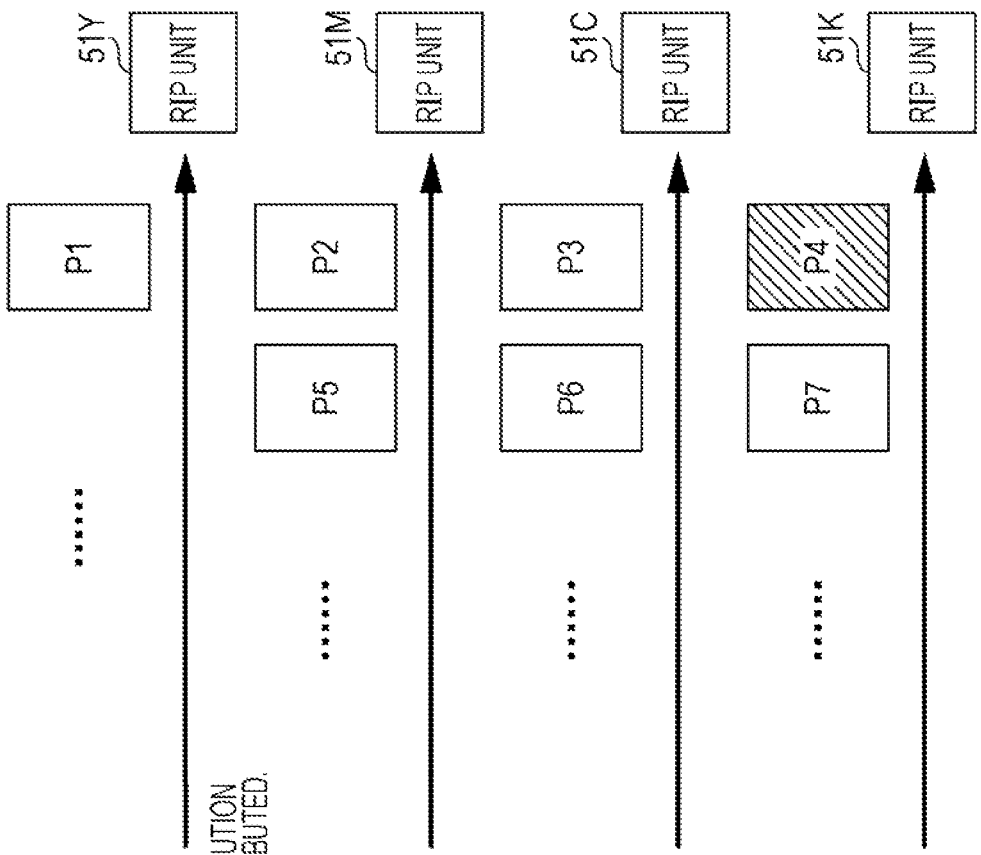
FIG. 17 is a diagram illustrating, in contrast to the state illustrated in FIG. 16, a middle scene of a case where the distribution unit has changed the distribution order.

In contrast to the state illustrated in FIG. 16, FIG. 17 illustrates a case where the distribution unit 42 has changed the distribution order.

Here, since the number of the image processing units (the number of the RIP units 51Y to 51K) S=4 and the number of pages per sheet N=1, S×N=4. Thus, the distribution unit 42 selects a distribution method such that one distribution destination is skipped every time four pages are distributed, and the following image processing unit is treated as the next distribution destination.

Specifically, the distribution unit 42 skips one distribution destination after distributing pages P1 to P4 to the respective RIP units 51Y to 51K, and distributes the next page P5 not to the RIP unit 51Y but to the RIP unit 51M. Thereafter the distribution unit 42 distributes a page P6 to the RIP unit 51C, and a page P7 to the RIP unit 51K.

Figure 18:
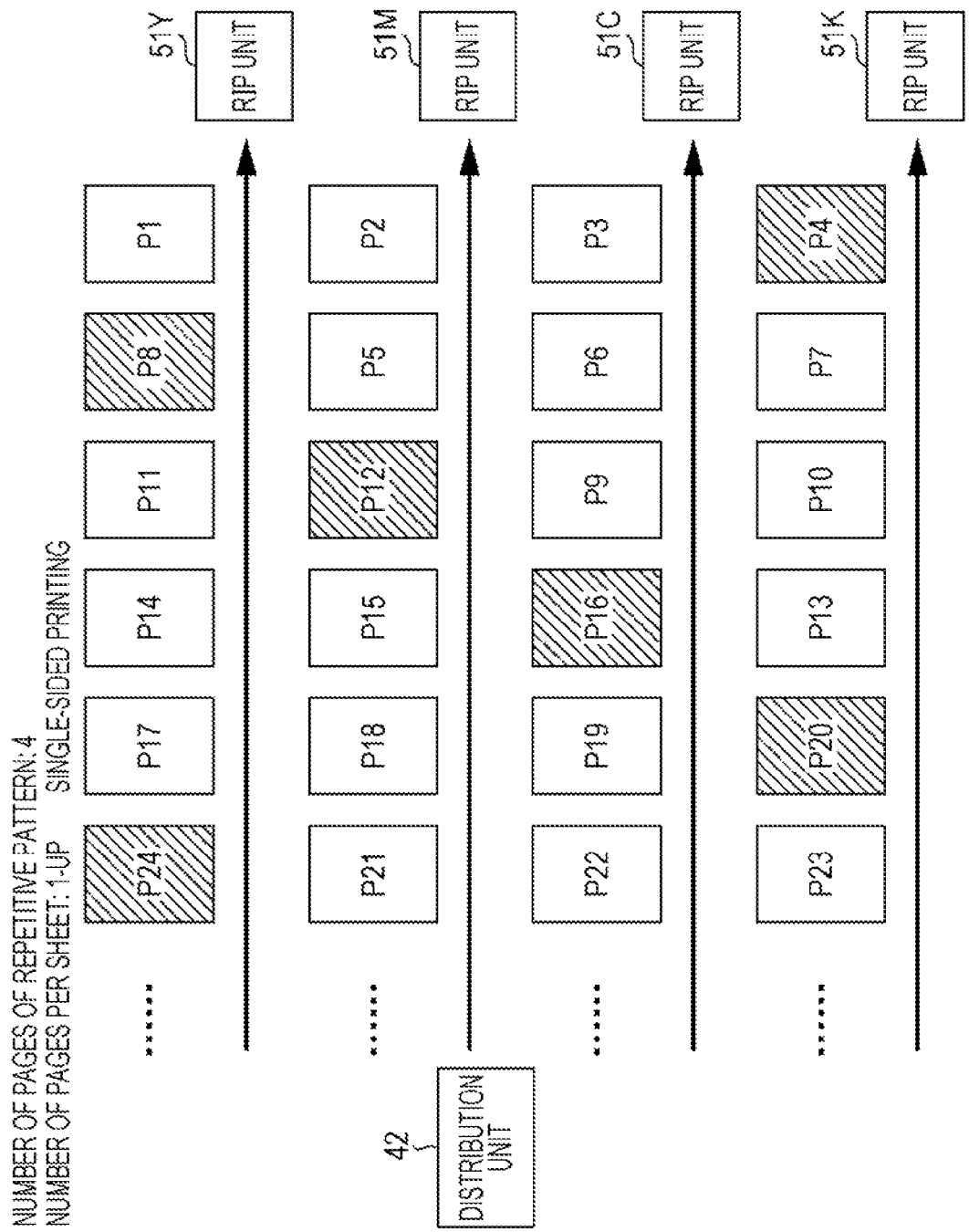
FIG. 18 is a diagram illustrating, in contrast to the state illustrated in FIG. 16, a case where the distribution unit has changed the distribution order.

The distribution unit 42 changes the preset distribution order and performs distribution in this manner. As a result, pages involving heavy processing loads are distributed to the RIP units 51Y to 51K in a dispersed manner as illustrated in FIG. 18.

[Number of Pages of Repetitive Pattern: 4, Number of Pages Per Sheet: 1, Double-Sided Printing]

Figure 19:
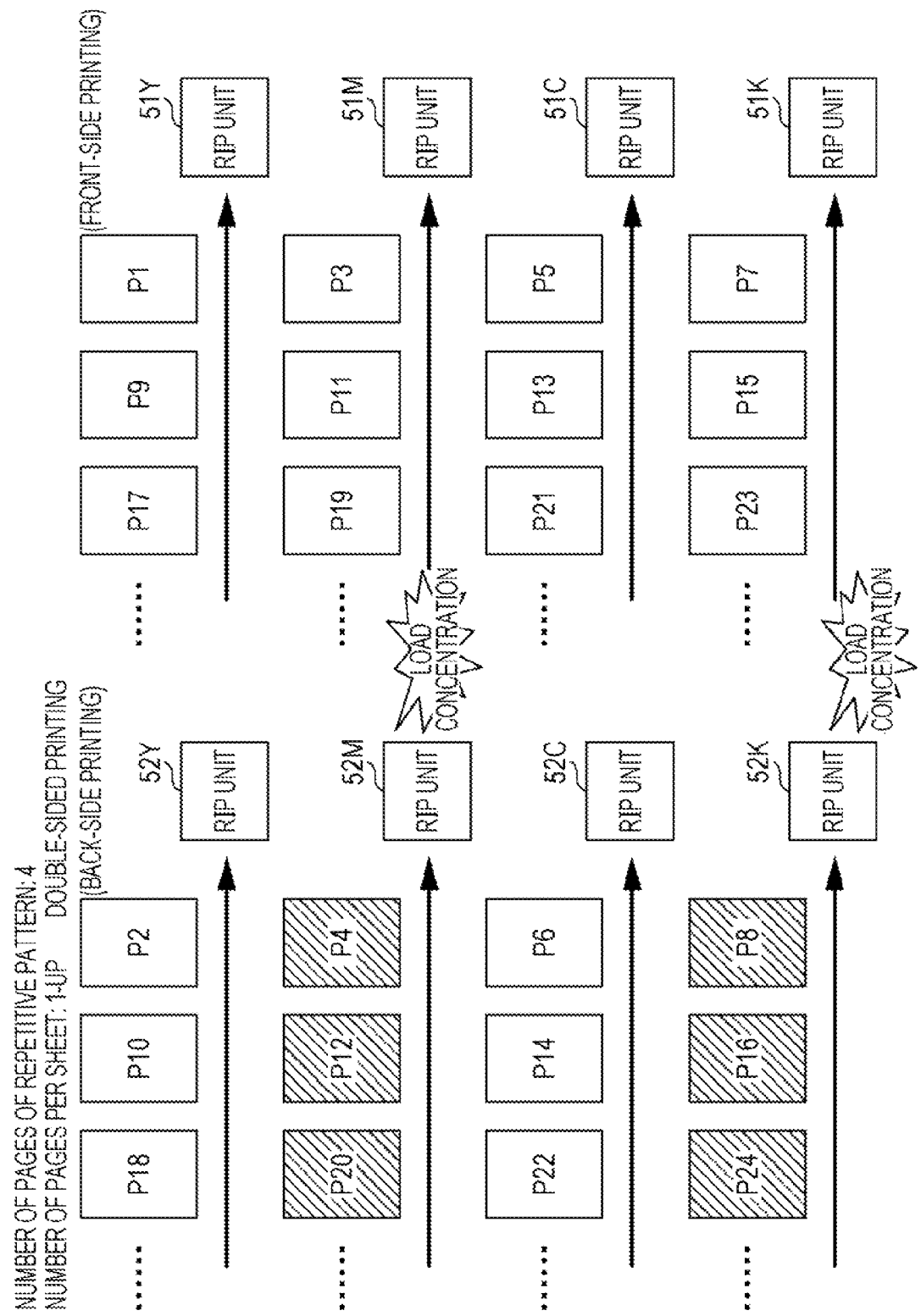
FIG. 19 is a diagram illustrating a case where the distribution unit distributes image data without changing the distribution order from a preset distribution order when the number of pages of a repetitive pattern is four, the number of pages per sheet is one, and double-sided printing is performed.

FIG. 19 illustrates a case where the distribution unit 42 distributes image data without changing the distribution order from a preset distribution order when the number of pages of a repetitive pattern is four, the number of pages per sheet is one, and double-sided printing is performed.

Note that eight image processing units are used in FIG. 19 in order to perform double-sided printing. The eight image processing units are the RIP units 51Y to 51K for performing front-side printing and RIP units 52Y to 52K for performing back-side printing.

With reference to FIG. 19, the number of pages of the repetitive pattern, which is four, may be divided without a reminder by four, which is an aliquot of the number (eight) of the image processing units. Thus, pages P4, P12, P20, and so on involving heavy processing loads are successively distributed to the RIP unit 52M. Pages P8, P16, P24, and so on involving heavy processing loads are successively distributed to the RIP unit 52K. As a result, it is clear that the processing load is concentrated at the RIP units 52M and 52K.

In contrast to the state illustrated in FIG. 19, FIG. 20 illustrates a case where the distribution unit 42 has changed the distribution order.

Here, since the number of the image processing units (the number of the RIP units 51Y to 51K and 52Y to 52K) S=8 and the number of pages per sheet N=1, S×N=8. Thus, the distribution unit 42 selects a distribution method such that two distribution destinations are skipped every time eight pages are distributed, and the following image processing unit is treated as the next distribution destination.

Specifically, the distribution unit 42 skips two distribution destinations after distributing pages P1 to P8 to the respective RIP units 51Y to 51K and 52Y to 52K, and distributes the next page P9 not to the RIP unit 51Y but to the RIP unit 51M. Thereafter the distribution unit 42 distributes a page P10 to the RIP unit 52M, and a page P11 to the RIP unit 51C.

The distribution unit 42 changes the preset distribution order and performs distribution in this manner. As a result, pages involving heavy processing loads are distributed in a dispersed manner as illustrated in FIG. 20.

[Number of Pages of Repetitive Pattern: 4, Number of Pages Per Sheet: 2, Single-Sided Printing]

FIG. 21 illustrates a case where the distribution unit 42 distributes image data without changing the distribution order from a preset distribution order when the number of pages of a repetitive pattern is four, the number of pages per sheet is two, and single-sided printing is performed.

With reference to FIG. 21, the number of pages of the repetitive pattern, which is four, may be divided without a reminder by four, which is the number of the image processing units. Thus, pages P4, P12, P20, and so on involving heavy processing loads are successively distributed to the RIP unit 51M. Pages P8, P16, P24, and so on involving heavy processing loads are successively distributed to the RIP unit 51K. As a result, it is clear that the processing load is concentrated at the RIP units 51M and 51K.

In contrast to the state illustrated in FIG. 21, FIG. 22 illustrates a case where the distribution unit 42 has changed the distribution order.

Here, since the number of the image processing units (the number of the RIP units 51Y to 51K) S=4 and the number of pages per sheet N=2, S×N=8. Thus, the distribution unit 42 selects a distribution method such that one distribution destination is skipped every time eight pages are distributed, and treating the following image processing unit as the next distribution destination.

Specifically, the distribution unit 42 skips one distribution destination after distributing pages P1 to P8 to the RIP units 51Y to 51K, and distributes the next pages P9 and P10 not to the RIP unit 51Y but to the RIP unit 51M. Thereafter the distribution unit 42 distributes pages P11 and P12 to the RIP unit 51C, and pages P13 and P14 to the RIP unit 51K.

The distribution unit 42 changes the preset distribution order and performs distribution in this manner. As a result, pages involving heavy processing loads are distributed in a dispersed manner as illustrated in FIG. 22.

Next, the following describes a case where the number of image processing units is not 4 but 5, and where the number of pages of a repetitive pattern is 10.

Specifically, the following describes a case where, as illustrated in FIG. 23, a print process is performed in accordance with a print job whose repetitive pattern is "0, 0, 1, 1, 0, 0, 0, 0, 1, 0". The number of pages of the repetitive pattern is 10.

[Number of Pages of Repetitive Pattern: 10, Number of Pages Per Sheet: 1, Single-Sided Printing]

First, FIG. 24 illustrates a case where the distribution unit 42 distributes image data without changing the distribution order from a preset distribution order when the number of pages of a repetitive pattern is 10, the number of pages per sheet is 1, and single-sided printing is performed.

Here, a case will be described where the distribution unit 42 distributes image data to five image processing units, which are the RIP units 51Y, 51M, and 51C, and RIP units 51K1 and 51K2.

With reference to FIG. 24, the number of pages of the repetitive pattern, which is 10, may be divided without a reminder by 5, which is the number of the image processing units. Thus, pages P4, P9, P14, P19, and so on involving heavy processing loads are successively distributed to the RIP unit 51K1. As a result, it is clear that the processing load is concentrated at the RIP unit 51K1.

In contrast to the state illustrated in FIG. 24, FIG. 25 illustrates a case where the distribution unit 42 has changed the distribution order.

Here, since the number of the image processing units (the number of the RIP units 51Y to 51K2) S=5 and the number of pages per sheet N=1, S×N=5. Thus, the distribution unit 42 selects a distribution method such that 1 distribution destination is skipped every time 10 pages (the number of pages of the repetitive pattern) are distributed, and the following image processing unit is treated as the next distribution destination.

Specifically, the distribution unit 42 skips one distribution destination after distributing pages P1 to P10 to the RIP units 51Y to 51K2, and distributes the next page P11 not to the RIP unit 51Y but to the RIP unit 51M. Thereafter the distribution unit 42 distributes a page P12 to the RIP unit 51C, and a page P13 to the RIP unit 51K1.

The distribution unit 42 changes the preset distribution order and performs distribution in this manner. As a result, pages involving heavy processing loads are distributed in a dispersed manner as illustrated in FIG. 25.

[Number of Pages of Repetitive Pattern: 10, Number of Pages Per Sheet: 1, Double-Sided Printing]

Figure 26:
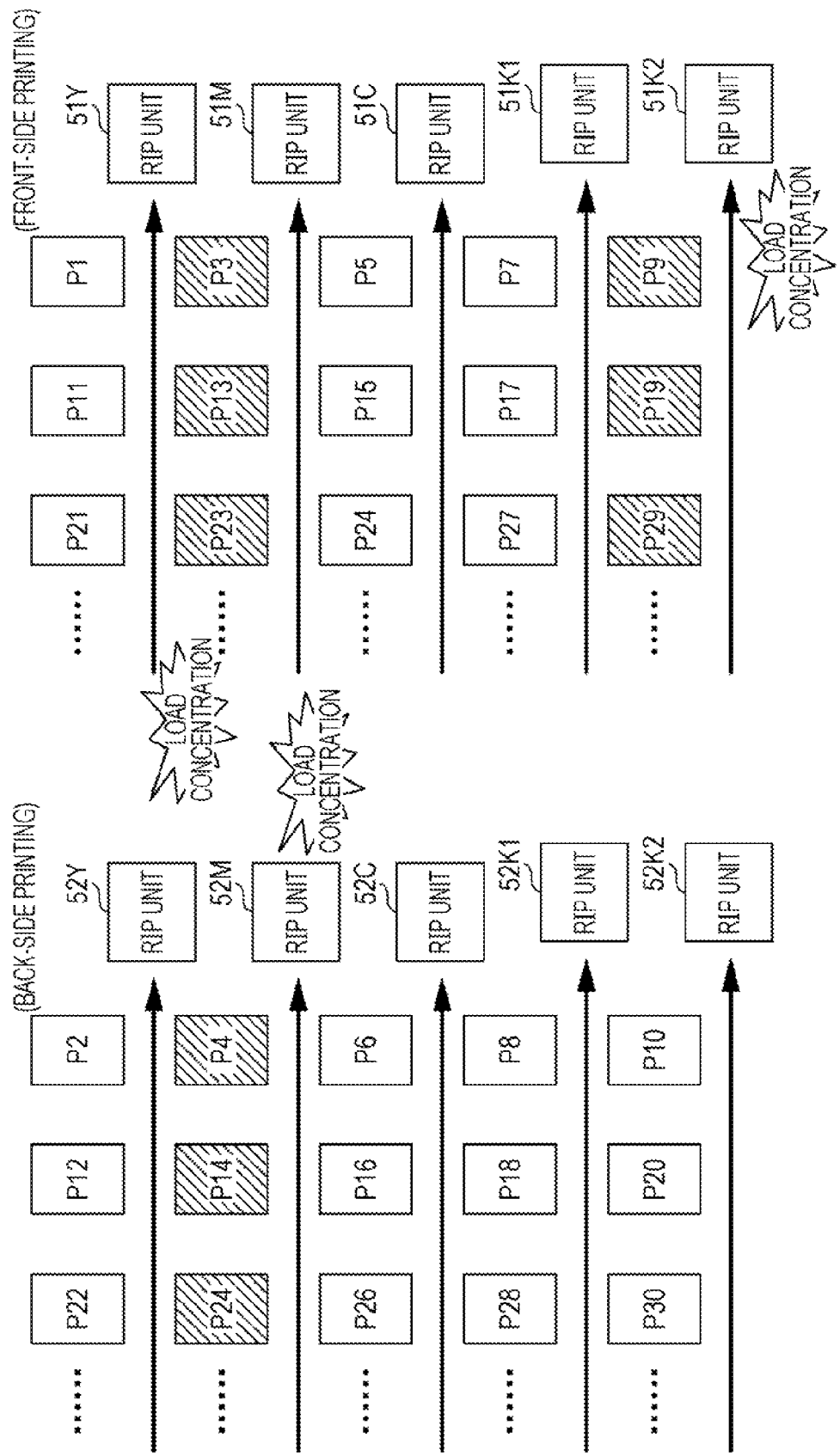
FIG. 26 is a diagram illustrating a case where the distribution unit distributes image data without changing the distribution order from a preset distribution order when the number of pages of a repetitive pattern is 10, the number of pages per sheet is 1, and double-sided printing is performed.

Next, FIG. 26 illustrates a case where the distribution unit 42 distributes image data without changing the distribution order from a preset distribution order when the number of pages of a repetitive pattern is 10, the number of pages per sheet is 1, and double-sided printing is performed.

Note that 10 image processing units are used in FIG. 26 in order to perform double-sided printing. The 10 image processing units are the RIP units 51Y to 51K2 for performing front-side printing and RIP units 52Y to 52K2 for performing back-side printing.

With reference to FIG. 26, the number of pages of the repetitive pattern, which is 10, may be divided without a reminder by 10, which is the number of the image processing units. Thus, pages involving heavy processing loads are successively distributed to the RIP units 51M, 51K2, and 52M. As a result, it is clear that the processing load is concentrated at the RIP units 51M, 51K2, and 52M.

Figure 27:
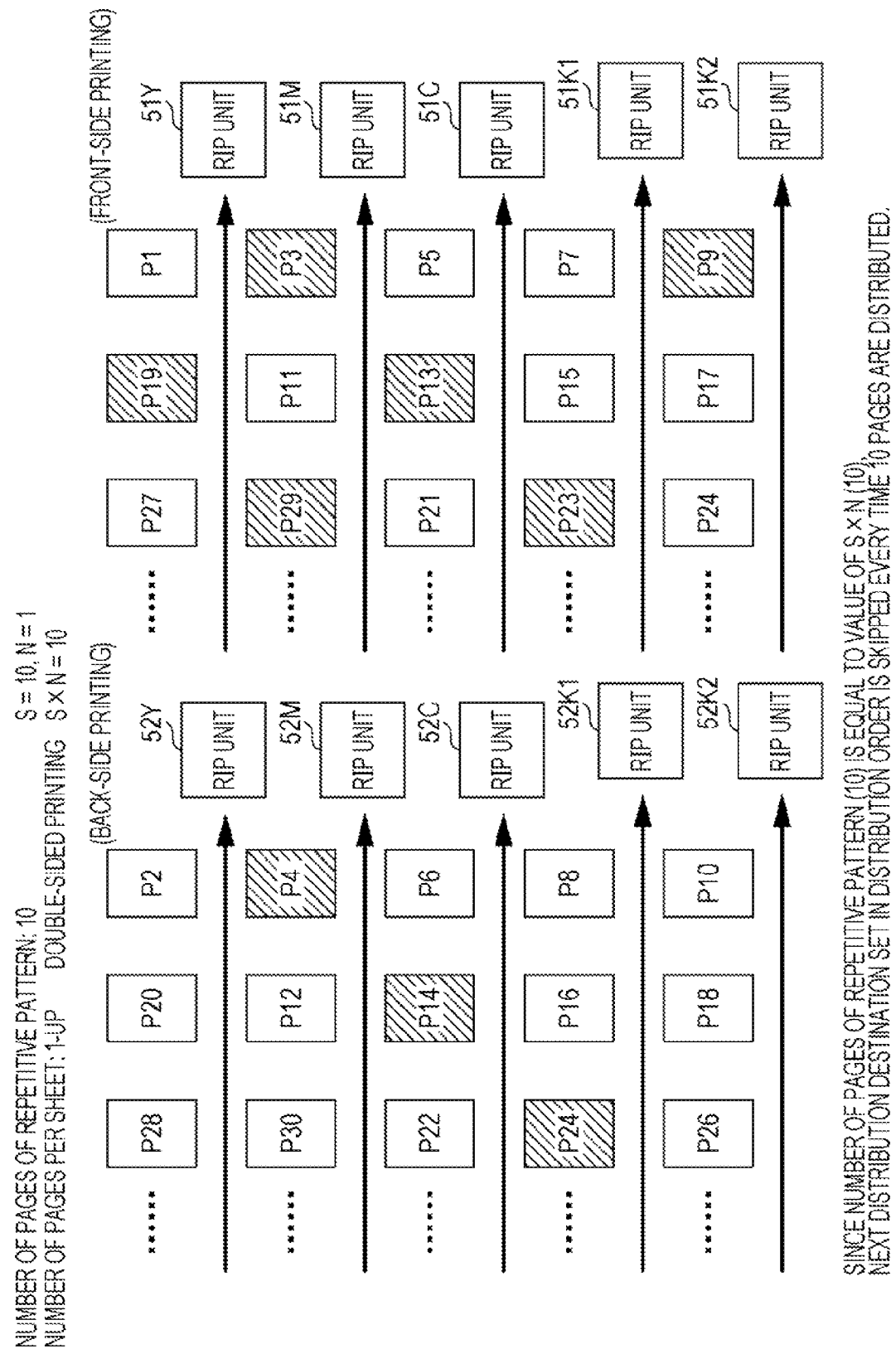
FIG. 27 is a diagram illustrating, in contrast to the state illustrated in FIG. 26, a case where the distribution unit has changed the distribution order.

In contrast to the state illustrated in FIG. 26, FIG. 27 illustrates a case where the distribution unit 42 has changed the distribution order.

Here, since the number of the image processing units (the number of the RIP units 51Y to 51K2 and 52Y to 52K2) S=10 and the number of pages per sheet N=1, S×N=10. Thus, the distribution unit 42 selects a distribution method such that two distribution destinations are skipped every time 10 pages (the number of pages of the repetitive pattern) are distributed, and the following image processing unit is treated as the next distribution destination.

Specifically, the distribution unit 42 skips two distribution destinations after distributing pages P1 to P10 to the respective RIP units 51Y to 51K2 and 52Y to 52K2, and distributes the next page P11 not to the RIP unit 51Y but to the RIP unit 51M. Thereafter the distribution unit 42 distributes a page P12 to the RIP unit 52M, and a page P13 to the RIP unit 51C.

The distribution unit 42 changes the preset distribution order and performs distribution in this manner. As a result, pages involving heavy processing loads are distributed in a dispersed manner as illustrated in FIG. 27.

[Number of Pages of Repetitive Pattern: 10, Number of Pages Per Sheet: 2, Single-Sided Printing]

Figure 28:
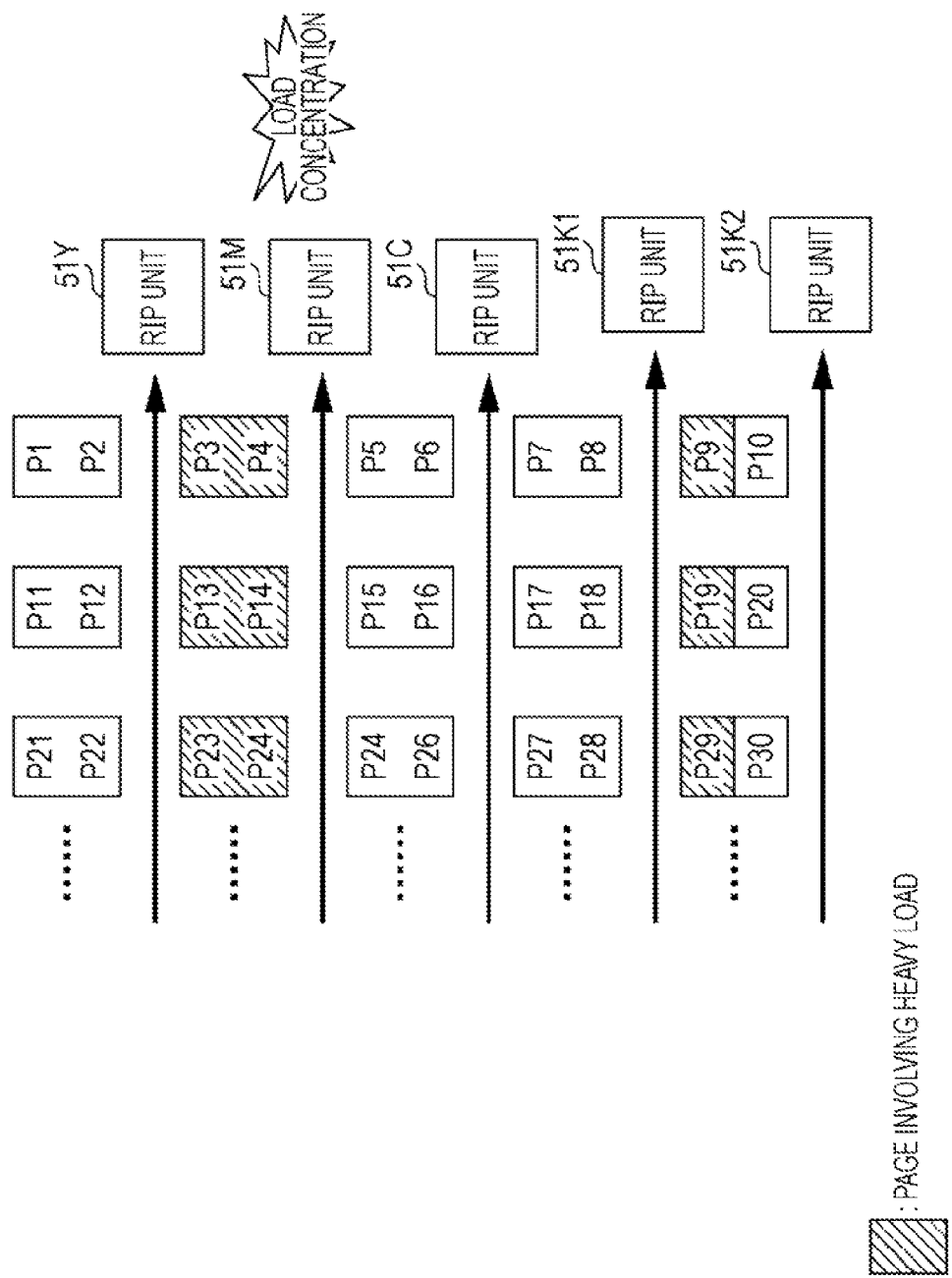
FIG. 28 is a diagram illustrating a case where the distribution unit distributes image data without changing the distribution order from a preset distribution order when the number of pages of a repetitive pattern is 10, the number of pages per sheet is 2, and single-sided printing is performed.

Next, FIG. 28 illustrates a case where the distribution unit 42 distributes image data without changing the distribution order from a preset distribution order when the number of pages of a repetitive pattern is 10, the number of pages per sheet is 2, and single-sided printing is performed.

With reference to FIG. 28, the number of pages of the repetitive pattern, which is 10, may be divided without a reminder by 5, which is the number of the image processing units. Thus, pages involving heavy processing loads are successively distributed to the RIP units 51M and 51K2. As a result, it is clear that the processing load is concentrated at the RIP units 51M and 51K2.

Figure 29:
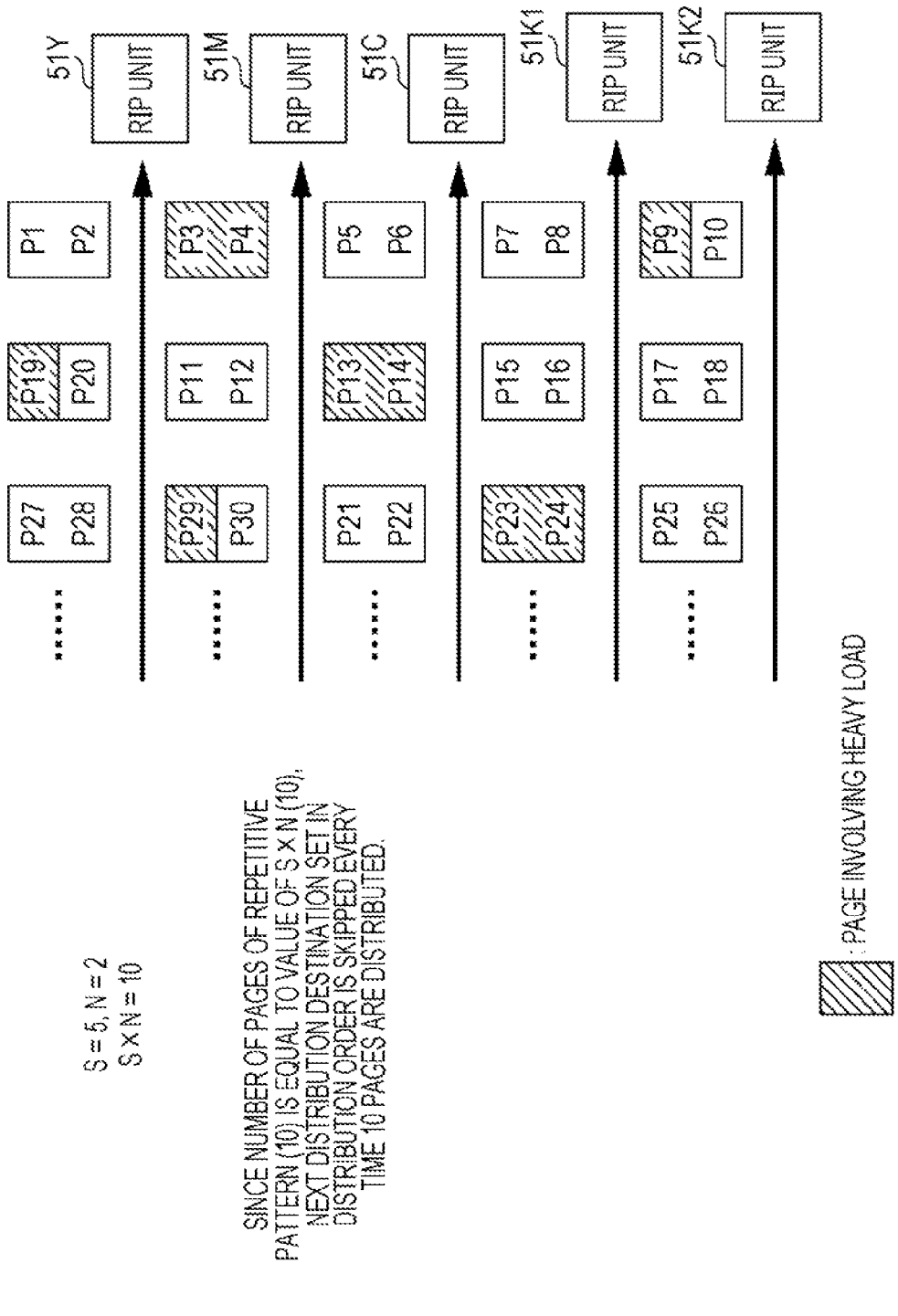
FIG. 29 is a diagram illustrating, in contrast to the state illustrated in FIG. 28, a case where the distribution unit has changed the distribution order.

In contrast to the state illustrated in FIG. 28, FIG. 29 illustrates a case where the distribution unit 42 has changed the distribution order.

Here, since the number of the image processing units (the number of the RIP units 51Y to 51K2) S=5 and the number of pages per sheet N=2, S×N=10. Thus, the distribution unit 42 selects a distribution method such that 1 distribution destination is skipped every time 10 pages are distributed, and the following image processing unit is treated as the next distribution destination.

Specifically, the distribution unit 42 skips one distribution destination after distributing pages P1 to P10 to the RIP units 51Y to 51K2, and distributes the next pages P11 and P12 not to the RIP unit 51Y but to the RIP unit 51M. Thereafter the distribution unit 42 distributes pages P13 and P14 to the RIP unit 51C, and pages P15 and P16 to the RIP unit 51K1.

The distribution unit 42 changes the preset distribution order and performs distribution in this manner. As a result, pages involving heavy processing loads are distributed in a dispersed manner as illustrated in FIG. 29.

[Number of Pages of Repetitive Pattern: 10, Number of Pages Per Sheet: 2, Double-Sided Printing]

Figure 30:
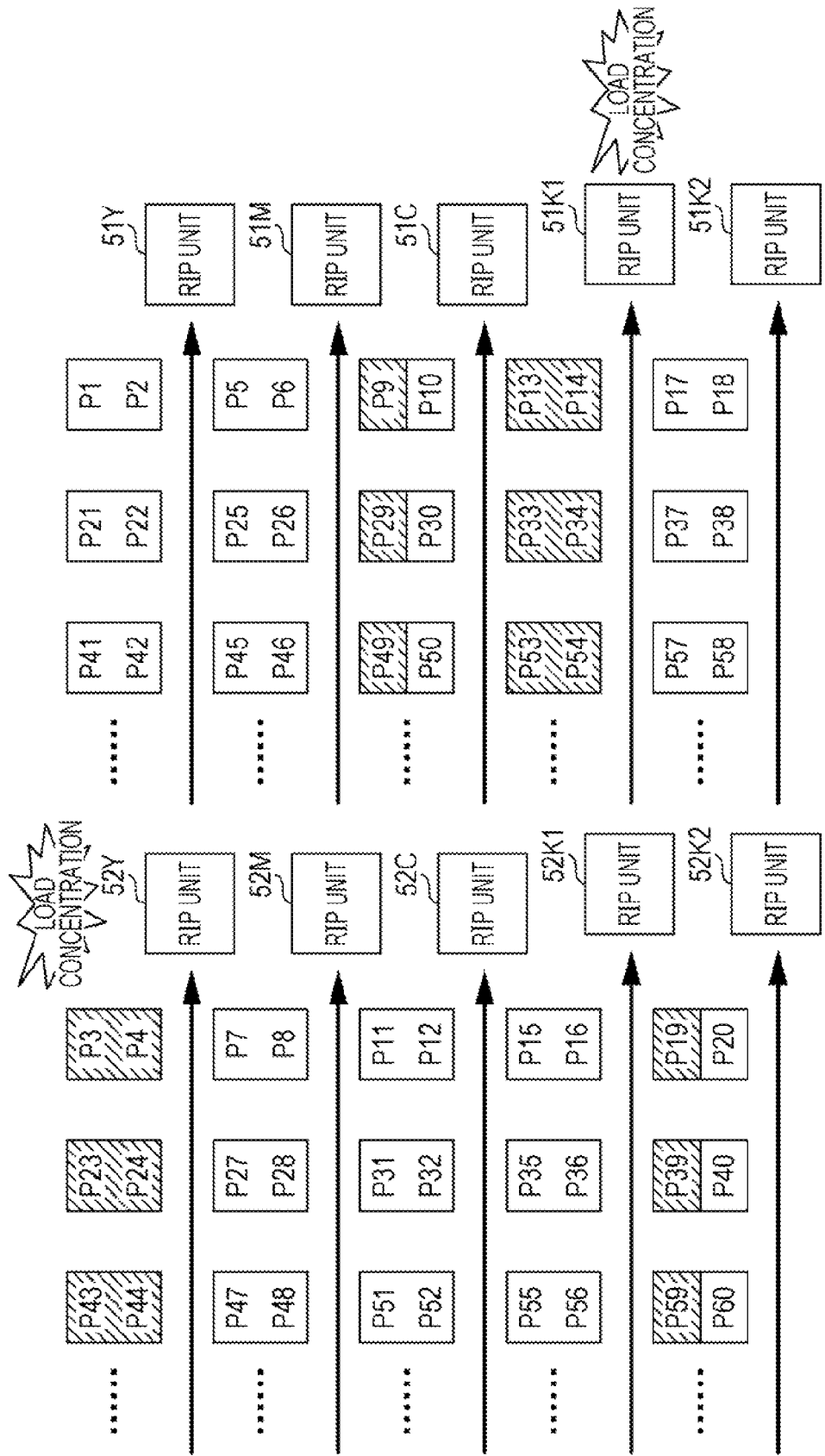
FIG. 30 is a diagram illustrating a case where the distribution unit distributes image data without changing the distribution order from a preset distribution order when the number of pages of a repetitive pattern is 10, the number of pages per sheet is 2, and double-sided printing is performed.

Lastly, FIG. 30 illustrates a case where the distribution unit 42 distributes image data without changing the distribution order from a preset distribution order when the number of pages of a repetitive pattern is 10, the number of pages per sheet is 2, and double-sided printing is performed.

With reference to FIG. 30, the number of pages of the repetitive pattern, which is 10, may be divided without a reminder by 10, which is the number of the image processing units. Thus, pages involving heavy processing loads are successively distributed to the RIP units 51K1 and 52Y. As a result, it is clear that the processing load is concentrated at the RIP units 51K1 and 52Y.

In contrast to the state illustrated in FIG. 30, FIG. 31 illustrates a case where the distribution unit 42 has changed the distribution order.

Here, since the number of the image processing units (the number of the RIP units 51Y to 51K2 and 52Y to 52K2) S=10 and the number of pages per sheet N=2, S×N=20. Thus, the distribution unit 42 selects a distribution method such that two distribution destinations are skipped every time 20 pages are distributed, and the following image processing unit is treated as the next distribution destination.

Specifically, the distribution unit 42 skips two distribution destinations after distributing pages P1 to P20 to the RIP units 51Y to 51K2 and 52Y to 52K2, and distributes the next pages P21 and P22 not to the RIP unit 51Y but to the RIP unit 51M. Thereafter the distribution unit 42 distributes pages P23 and P24 to the RIP unit 52M, and pages P25 and P26 to the RIP unit 51C.

The distribution unit 42 changes the preset distribution order and performs distribution in this manner. As a result, pages involving heavy processing loads are distributed in a dispersed manner as illustrated in FIG. 31.

[Modification]

The exemplary embodiment is described using the configuration in which the controller 10 and the printer 30 are configured independently; however, the configuration of the present invention is not limited to this configuration. The present invention may be likewise applied to a case where the controller 10 and the printer 30 are configured as an integral image forming apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor that acts as:
a plurality of image processing units that perform image processing to convert image data distributed on a page-by-page basis into raster-format color print data, the raster-format color print data including pieces of print data for colors;
a cyclicity detector that detects a processing-load cycle of a case where image data is converted into print data on a page-by-page basis, information regarding the processing-load cycle includes information regarding the number of pages of a repetitive cycle, which is the number of pages in units of which a processing-load pattern is cyclically repeated; and
a distribution unit that distributes on a page-by-page basis to the plurality of image processing units image data included in a received print command and, in a case where it is determined in accordance with the processing-load cycle detected by the processor acting as the detector and a number of the plurality of image processing units that pages involving heavy processing loads may be distributed to a specific image processing unit in a non-uniform manner, that changes, from a preset distribution order, a distribution order of the plurality of image processing units, to which image data is distributed, and in a case where the number of pages of the repetitive cycle may be divided without a reminder by the number of the image processing units or an aliquot of the number other than one, the processor acting as the distribution unit changes, from the preset distribution order, the distribution order of the plurality of image processing units, to which the image data is distributed, to thereby reduce a delay in printing.

2. The image processing apparatus according to claim 1, wherein the processor acting as the cyclicity detector acquires, from the processor acting as the plurality of respective image processing units, pieces of information regarding processing time periods required to convert the image data into the print data, determines a processing load on a page-by-page basis for a case where the image data is converted into the print data, and then detects a processing-load cycle.

3. The image processing apparatus according to claim 2, wherein, every time the processor acting as the distribution unit distributes image data of pages the number of which is the greater one of the number obtained by multiplying the number of the image processing units by the number of pages per sheet and the number of pages of the repetitive cycle, the processor acting as the distribution unit skips the image processing unit that is the next distribution destination set in the preset distribution order and to which the next image data is supposed to be distributed.

4. The image processing apparatus according to claim 1, wherein, every time the processor acting as the distribution unit distributes image data of pages the number of which is the greater one of the number obtained by multiplying the number of the image processing units by the number of pages per sheet and the number of pages of the repetitive cycle, the processor acting as the distribution unit skips the image processing unit that is the next distribution destination set in the preset distribution order and to which the next image data is supposed to be distributed.

5. An image processing apparatus comprising:
a processor that acts as:
a plurality of image processing units that perform image processing to convert image data distributed on a page-by-page basis into raster-format color print data, the raster-format color print data including pieces of print data for colors;
a cyclicity detector that detects a processing-load cycle of a case where image data is converted into print data on a page-by-page basis, information regarding the processing-load cycle includes information regarding the number of pages of a repetitive cycle, which is the number of pages in units of which a processing-load pattern is cyclically repeated; and a memory that stores information regarding the processing-load cycle detected by the cyclicity detector; and in a case where when image data included in a received print command is distributed to the plurality of image processing units on a page-by-page basis, it is determined in accordance with information regarding the processing-load cycle stored in the memory and a number of the plurality of image processing units that pages involving heavy processing loads may be distributed to a specific image processing unit in a non-uniform manner, a distribution unit that changes, from a preset distribution order, a distribution order of the plurality of image processing units, to which image data is distributed, and in a case where the number of pages of the repetitive cycle may be divided without a reminder by the number of the image processing units or an aliquot of the number other than one, the processor acting as the distribution unit changes, from the preset distribution order, the distribution order of the plurality of image processing units, to which the image data is distributed, to thereby reduce a delay in printing.

6. The image processing apparatus according to claim 5, wherein the processor acting as the cyclicity detector acquires, from the processor acting as the plurality of respective image processing units, pieces of information regarding processing time periods required to convert the image data into the print data, determines a processing load on a page-by-page basis for a case where the image data is converted into the print data, and then detects a processing-load cycle.

7. The image processing apparatus according to claim 6, wherein, every time the processor acting as the distribution unit distributes image data of pages the number of which is the greater one of the number obtained by multiplying the number of the image processing units by the number of pages per sheet and the number of pages of the repetitive cycle, the processor acting as the distribution unit skips the image processing unit that is the next distribution destination set in the preset distribution order and to which the next image data is supposed to be distributed.

8. The image processing apparatus according to claim 5, wherein, every time the processor acting as the distribution unit distributes image data of pages the number of which is the greater one of the number obtained by multiplying the number of the image processing units by the number of pages per sheet and the number of pages of the repetitive cycle, the processor acting as the distribution unit skips the image processing unit that is the next distribution destination set in the preset distribution order and to which the next image data is supposed to be distributed.

9. An image forming apparatus comprising:

a processor that acts as:

a plurality of image processing units that perform image processing to convert image data distributed on a page-by-page basis into raster-format color print data, the raster-format color print data including pieces of print data for colors;

a cyclicity detector that detects a processing-load cycle of a case where image data is converted into print data on a page-by-page basis, information regarding the processing-load cycle includes information regarding the number of pages of a repetitive cycle, which is the number of pages in units of which a processing-load pattern is cyclically repeated;

a distribution unit that distributes on a page-by-page basis to the plurality of image processing units image data included in a received print command and, in a case where it is determined in accordance with the processing-load cycle detected by the processor acting as the cyclicity detector and a number of the plurality of image processing units that pages involving heavy processing loads may be distributed to a specific image processing unit in a non-uniform manner, that changes, from a preset distribution order, a distribution order of the plurality of image processing units, to which image data is distributed, and in a case where the number of pages of the repetitive cycle may be divided without a reminder by the number of the image processing units or an aliquot of the number other than one, the processor acting as the distribution unit changes, from the preset distribution order, the distribution order of the plurality of image processing units, to which the image data is distributed, to thereby reduce a delay in printing; and an output unit that outputs, onto a recording medium, an image based on the raster-format color print data obtained by conversion performed by the plurality of image processing units.

\* \* \* \* \*